(12) United States Patent
Ouimette

(10) Patent No.: US 10,171,663 B1
(45) Date of Patent: Jan. 1, 2019

(54) ESTABLISHING A TARGET HANDLE TIME FOR A COMMUNICATION IN A CONTACT CENTER USING ANALYTICS

(71) Applicant: Noble Systems Corporation, Atlanta, GA (US)

(72) Inventor: Jason P. Ouimette, Berkeley Lake, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 15/897,800

(22) Filed: Feb. 15, 2018

(51) Int. Cl.
  *H04M 3/00* (2006.01)
  *H04M 3/51* (2006.01)
  *G10L 15/08* (2006.01)
  *G10L 15/22* (2006.01)

(52) U.S. Cl.
  CPC ........... *H04M 3/5175* (2013.01); *G10L 15/08* (2013.01); *G10L 15/22* (2013.01); *H04M 3/5183* (2013.01); *G10L 2015/088* (2013.01); *H04M 2201/40* (2013.01); *H04M 2201/42* (2013.01); *H04M 2203/401* (2013.01)

(58) Field of Classification Search
  CPC ........... H04M 3/5175; H04M 3/42221; H04M 3/5166

USPC ........................................ 379/265.06–265.08
See application file for complete search history.

(56) References Cited

U.S. PATENT DOCUMENTS

| 9,129,265 | B2 | 9/2015 | Reyes | |
| 9,225,833 | B1* | 12/2015 | Koster | H04M 3/5175 |
| 9,392,114 | B1* | 7/2016 | Bobowski | H04M 3/5175 |
| 2008/0267386 | A1 | 10/2008 | Cooper | |
| 2014/0211933 | A1 | 7/2014 | Vymenets et al. | |
| 2015/0326710 | A1* | 11/2015 | Amerling | H04W 4/90 379/243 |

\* cited by examiner

*Primary Examiner* — Rasha Al Aubaidi

(57) ABSTRACT

Various embodiments of the invention provide methods, systems, and computer program products for establishing a target handle time (THT) for a communication routed to an agent in a contact center. Specifically, an analytics component is used to detect a keyword in the communication that identifies a reason for the communication. Accordingly, a THT is set for the communication based on the identified reason and a visual representation of the THT is displayed that includes a component decrementing with the passage of time. At some point, the communication is completed and a disposition code is entered for the communication. Accordingly, in particular embodiments, the disposition code is then confirmed to match the reason for the communication to ensure the correct reason was identified and the correct corresponding THT was set.

24 Claims, 16 Drawing Sheets

ESTABLISHING A TARGET HANDLE TIME FOR A COMMUNICATION IN A CONTACT CENTER USING ANALYTICS

BACKGROUND

As with most industries, of great importance to contact centers is that they are performing efficiently. In general terms, efficiency is considered a measure of the extent to which input is well used for an intended task or function (output). Contact centers make use of several inputs to service communications with various parties that include different technologies, systems, and communication channels, as well as personnel who handle communications such as agents, supervisors, and managers. Accordingly, many contact centers monitor several different metrics that provide a measure of how efficient the centers are operating and making use of these inputs. One of these metrics that is commonly monitored is average handle time.

Average handle time (AHT) measures the average duration of time spent by an agent on a communication with a party. For example, the AHT can measure the average duration of time spent by an agent on a phone call speaking with a party, placing the party on hold, if needed, and wrapping up the call once the agent has finished speaking with the party. While in another instance, the AHT can measure the average duration of time spent by an agent exchanging messages with a party on a chat session or via texts and wrapping up the chat session or texts once the agent has finished exchanging messages with the party.

The leading thought behind AHT is the lower an AHT a contact center can maintain, the more efficient the contact center is operating and the better the contact center is making use of its agent resources. However, a tradeoff can occur when the AHT drops to such a low level that not enough time is spent by agents on communications to adequately address the reasons for conducting the communications. For example, parties may be calling into a contact center for customer service and agents may be rushing to complete the calls with parties to maintain a low AHT. However, because the agents are rushing the calls, they may be failing to address the parties' issues for calling customer service. As a result, many of these parties may need to call into the contact center multiple times to resolve their issues and may become frustrated and disgruntled customers. Therefore, although the contact center appears to be running efficiently because of the low AHT, in actuality the contact center is not making good use of its agent resources because the agents are not adequately helping the parties who have called into customer service. Thus, many contact centers must be careful in how they incorporate and manage AHT in evaluating the efficiency of the centers.

One approach used by many contact centers in managing AHT is to monitor an agent's AHT for various communication channels with respect to a target handle time (THT). This THT is an ideal amount of time an agent should spend on a communication and helps a contact center to identify agents are consistently spending more time than should be needed to handle communications. For example, a particular contact center may monitor whether the AHT for calls taken by its agents is greater than to a THT of five minutes. Typically a contact center establishes the THT for a particular channel of communication based on passed history of communications handled for the channel. The contact center then uses the THT to evaluate the AHT for an agent resulting from all of the communications using that channel handled by the agent.

However, for any one communication, an agent may require more or less time than usual to handle the communication depending on the circumstances of the communication. For example, a customer service call involving a customer calling to check on the status of an order may typically require two minutes to handle while a customer service call involving a customer calling to return an item for refund may typically require ten minutes to handle. Thus, simply using a single THT for customer service calls can lead a contact center to improperly evaluate the efficiency of its agents and to misleading information if the agents are handling a high number of calls that typically require more time to handle than the THT. Furthermore, simply using a single THT can also limit the information that can be gleaned from monitoring handle times for agents. It is with respect to these considerations and others that the disclosure herein is presented.

SUMMARY

In general, embodiments of the present invention provide computer program products, methods, systems, apparatus, and computing entities for establishing a target handle time for a communication routed to an agent in a contact center. For instance, in various embodiments, an analytics component is used to monitor the communication and detect a keyword in the communication that identifies a reason for the communication. Accordingly, a target handle time is then set for the communication based on the identified reason and a visual representation of the target handle time is displayed on the GUI that includes a component decrementing with the passage of time. This component serves as a depiction in various embodiments with respect to the agent's conformance with the THT set for the communication based on the reason identified for the communication.

In particular embodiments, the component may be initially displayed on the GUI as a default target handle time decrementing with the passage of time that is then revised once the reason for the communication has been identified to display the target handle time set based on the reason minus a decrement of the default target handle time. Here, the result of subtracting the decrement of the default target handle time from the target handle time may then be decremented with the passage of time.

Furthermore, in particular embodiments, the component may be initially displayed on the GUI using a first color such as green for example. Here, the component may be displayed in this first color to signal to the agent that he or she has ample time to handle the communication. Accordingly, the component may then be displayed using a second color such as yellow for example in response to the component decrementing below a first threshold. Here, the component may be displayed in the second color to signal to the agent that he or she is approaching the target handle time set for the communication. Finally, the component may then be displayed using a third color such as red for example in response to the component decrementing below a second threshold. Here, the component may be displayed in the third color to signal to the agent that he or she has used more time than the target handle time set for the communication.

At some point, the agent completes the communication and a disposition code is entered for the communication. Again, the agent may select the disposition code or an event can signal the disposition code. Accordingly, in particular embodiments, the disposition code is confirmed to match the reason for the communication to ensure the correct reason was identified for the communication and the correct corresponding target handle time was set for the communication. If the disposition code and reason do match, then the target handle time is recorded for the communication. If the disposition code and reason do not match, then a revised target handle time is set based on the disposition code and this revised target handle time is recorded for the communication.

Finally, in particular embodiments, an actual handle time is determined for the communication representing the actual amount of time elapsed while the agent interacted with a party on the communication to address the reason for the communication. Here, a difference is determined between the actual handle time and the target handle time or the revised target handle time and the communication is tagged if the difference is greater than a threshold. Accordingly, in particular instances, the communication may be tagged as non-conformant with a high actual handle time if the actual handle time is greater than the target handle time or the revised handle time or may be tagged as non-conformant with a low actual handle time if the actual handle time is less than the target handle time or the revised target handle time. While in other instances, a first performance statistic may be updated to reflect the actual handle time is too high for the communication if the actual handle time is greater than the target handle time or the revised target handle time or a second performance statistic may be updated to reflect the actual handle time is too low for the communication if the actual handle time is less than the target handle time or the revised target handle time. In these particular instances, a second communication may be routed to the agent by a communications handler based on at least one of the first performance statistic and the second performance statistic.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
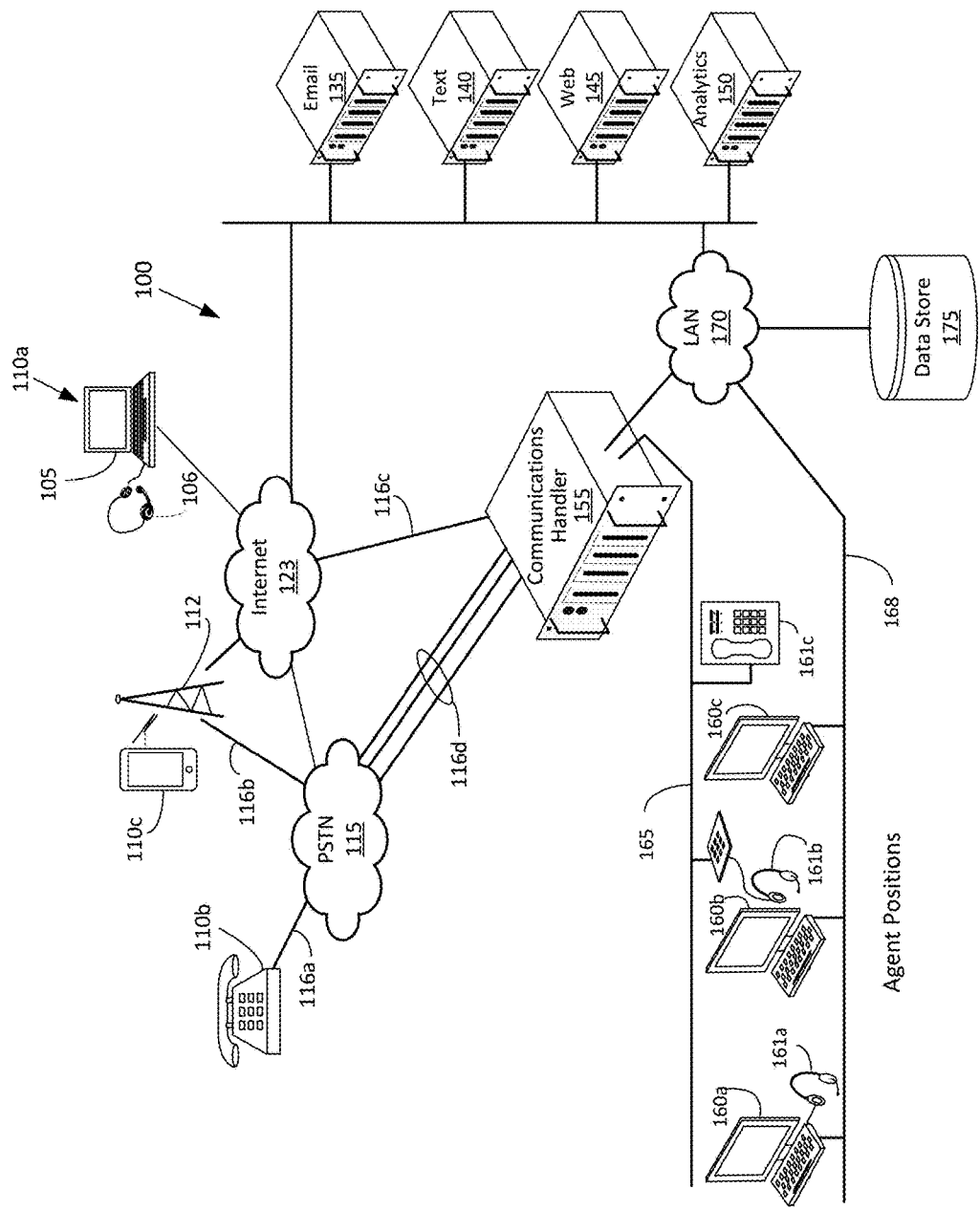
FIG. 1 illustrates an architecture of various components of a contact center that may be used in accordance with various embodiments of the present invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 illustrates a contact center architecture 100 that may be used in accordance with the various technologies and concepts disclosed herein. The contact center architecture 100 shown in FIG. 1 may process voice communications and non-voice communications that are inbound-only, outbound-only, or a combination of both (sometimes referred to as a "blended" contact center). Therefore, although many aspects of contact center operation may be disclosed in the context of voice calls, the contact center may process other forms of communication such as, for example, facsimiles, emails, text messages, video calls, and chat messages.

Since the contact center may handle communications originating from a party, or initiated to a party, the term "party," "user," or "customer" without any further qualification, refers to a remote person associated with a communication processed by the contact center, where the communication is either received from or placed to the party. Thus, use of these terms is not intended to limit the concepts described in this application.

Accordingly, inbound voice calls can originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: Ti trunks, SONET based fiber optic networks, ATM networks, etc. Various types of routers, switches, bridges, gateways, and other types of equipment may be involved in the processing of the calls.

Inbound voice calls may also originate from a mobile phone device 110c, such as a smart phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123 using Internet-based protocols, such as SIP or H.323 protocols. For convenience, unless indicated otherwise, the term "trunk" refers to any type of facility 116c, 116d providing voice calls to, or from, the contact center, regardless of the type of protocol or technology used. Specifically, a "trunk" is not limited to time-division multiplexing ("TDM") technology, but could refer to various VoIP communication channels.

Inbound voice calls may also originate from a calling party employing a so-called "IP phone," "VoIP phone," or "soft phone" 110a. In particular embodiments, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP") and the call may be conveyed by an Internet provider 123. Those skilled in the art will recognize that a variety of Internet Protocols ("IP") and facilities may be used to convey voice calls.

The term "voice call" may encompass a voice call using any form of currently available technology and/or originating from any type of device, such as a soft phone 110a, a conventional telephone 110b, a mobile phone 110c, or other device known in the art. The term "call" as used herein may encompass an active instance of two-way communication, an attempt to establish two-way communication, or a portion of the two-way communication. For example, a user at a conventional telephone 110b can dial a voice call in an attempt to establish two-way communication, and a call can be said to exist even prior to establishment of the two-way connection.

In various embodiments, inbound voice calls from calling parties to the contact center may be received at a communications handler 155, which could be, for instance, an automatic call distributor ("ACD"). In particular embodiments, the communications handler 155 may be a specialized switch for receiving and routing inbound calls under various conditions. Further, the communications handler 155 may be embodied as a dedicated form of equipment readily available from various manufacturers, or the communications handler 155 may be a so-called "soft switch" comprising a suitable programming module executed by a processing device to perform the necessary specialized functions. The communications handler 155 may route an incoming call over contact center facilities 165 to a phone device used by an available agent for servicing. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the communications handler 155.

The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. For instance, the voice device 161a-161c may be a soft phone device exemplified by a headset 161a connected to the computer 160a. Here, the soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

The combination of computing device 160a-160c and voice device 161a-161c may be referred to as a "workstation." Thus, for these particular embodiments, the workstation collectively has a data capability and a voice capability, although separate devices may be used. Here, data may be provided to an agent's workstation computer 160a-160c over facilities 168 along with routing the call to the agent's workstation voice device 161a-161c over other facilities 165. In some instances, "workstation" may be used in reference to either the data or voice capability at the agent's position. For example, "routing the call to the agent's workstation" means routing a call to the voice device 161a-161c at the agent's position. Similarly, "routing the call to the agent" means routing a call to the appropriate equipment at an agent's position. The workstation typically has a display provided via a computer monitor. This is used to convey information to the agent about the calls, and the agent may interact with the communications handler 155 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Agents typically log onto their workstations prior to handling calls. The workstation may also communicate this login information to the communications handler 155 to allow the contact center (including the communications handler 155) to know which agents are available for handling calls. In particular embodiments, the communications handler 155 may also maintain data on an agent's skill level that may be used to route a specific call to the agent or group of agents having the same skill level. The communications handler 155 may also know what types of channels and combinations of channels the agent can handle.

Accordingly, in various embodiments, the communications handler 155 may place a call in a queue if there are no suitable agents available to handle the call, and/or the handler 155 may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components such as, for example, a data store 175 to retrieve or provide information for processing the call. In other configurations, the IVR may be used to only provide announcements.

As noted, the contact center may also receive non-voice communications such as, for example, texts (short messaging service ("SMS") and/or multimedia messaging service ("MMS")), emails, and chats. For instance, text messages may be sent by parties using smart phones 110c over a MSP 112 and the Internet 123 and are received by a text gateway server 140. Once received, the text gateway server 140 in particular embodiments may inform the communications handler 155 of the text messages and the handler 155 may then queue up the text messages for appropriate agents.

In other embodiments, the contact center may make use of one or more components separate from the handler 155, such as a communications router (not shown in FIG. 1) that instead handles the routing of various communications to agents. For instance, in these particular embodiments, the text gateway server 140 may instead inform a communications router of the text messages and the router may then queue up the text messages for appropriate agents. Similarly, the communications handler 155 may also inform the communications router of various calls so that the router can then queue up the calls for appropriate agents. However, with that said, the remainder of the specification makes reference to a communications handler 155 to carry out such functionality, although it should be understood that portions of the communication handler's 155 functionality may be performed by one or more other components within the contact center architecture 100.

Similarly, emails may be sent by users over the Internet 123 to an email server 135, and the email server 135 may inform the communications handler 155 of the emails so that the communications handler 155 can queue up the emails for appropriate agents. With respect to chats, in various embodiments a party can request a chat by accessing a website via a Web server 145. In turn, the Web server 145 informs the communications handler 155 of the chat and the handler 250 queues the appropriate agent to handle the chat.

Depending on the embodiment, the interactions between the various components shown may involve using a local area network ("LAN") 170. However, other configurations are possible, such as, but not limited to, using a wide area network, wireless network, router, bridge, direct point-to-point links, etc. Furthermore, in lieu of using facilities 165 directly linked to the communications handler 155 for conveying audio to the agents, other facilities 168 associated with the LAN 170 may be used.

In addition to receiving inbound communications, the contact center may also originate communications to parties, referred to herein as "outbound" communications. For instance, in particular embodiments, the communications handler 155 may be a dialer, such as a predictive dialer, that originates outbound calls at a rate designed to meet various criteria. Here, the communications handler 155 may include functionality for originating calls, and if so, this functionality may be embodied as a private automatic branch exchange ("PBX" or "PABX"). In addition, the communications handler 155 may directly interface with voice trunks using facilities 116c, 116d to the PSTN 115 and/or Internet provider 123 for originating calls. After the calls are originated, the communications handler 155 may perform a transfer operation to connect the calls with agents, a queue, or an IVR. Furthermore, in various embodiments, the communications handler 155 may make use of one or more algorithms to determine how and when to dial a list of numbers so as to minimize the likelihood of a called party being placed in a queue while maintaining target agent utilization. In similar fashion, the email server 135, text gateway server 140, and the Web server 145 can be utilized in various embodiments to originate outbound emails, text messages, and chats with parties.

In various embodiments, the communications handler 155 determines which agent is authorized and available to handle a communication upon being made aware of a voice or non-voice communication, and thereafter appropriately coordinates any response to the communication. In addition, the communications handler 155 may also make use of one or more schemes in allocating communications to agents such as, for example, on a round-robin basis, a least-number-served basis, a first available agent basis, and/or a seniority basis.

Furthermore, in various embodiments, the communications handler 155 is configured to establish a connection to some type of analytics component 150 upon being made aware of a voice or non-voice communication. Thus, in particular embodiments, the contact center architecture 100 may include one or more dedicated channels (e.g., call legs) between the communications handler 155 and the one or more analytics components 150 suitable for conveying the communication (e.g., audio from a call) between the communications handler 155 and the analytics component(s) 150.

In turn, the analytics component 150 analyzes the communication once a connection is established and provides an indication (e.g., event notification) when a particular word or phrase is detected in the communication. This word or phrase is referred to as a "keyword," although use of the term "keyword" should not be construed as limiting recognition to a single word.

For instance, the communication may be a phone call and the analytics component 150 may be a speech analytics component that analyzes the audio of the phone call to detect keywords that are spoken on the call by either the remote party or the agent. Here, a number of different analytics approaches may be employed by the speech analytics component depending on the embodiment. For example, the speech analytics component may make use of one or more of a phonetics approach, large-vocabulary continuous speech recognition (LVCSR) approach, and/or direct phrase recognition approach in performing voice analytics on the phone call.

While in another instance, the communication may be an exchange of text messages or Web chat messages and the analytics component 150 may be a text recognition component that analyzes the text of the text or Web chat messages to detect keywords that are typed by either the remote party or the agent. Here, for example, the text recognition component may make use of full-text search techniques or optical character recognition (OCR) to identify keywords in the text or Web chat messages. As is discussed in greater detail below, the communications handler 155 receives event notifications from the analytics component 150 when keywords are identified, and the communication handler 155 may then forward these notifications to the appropriate workstation of the agent handling the communication.

Figure 2:
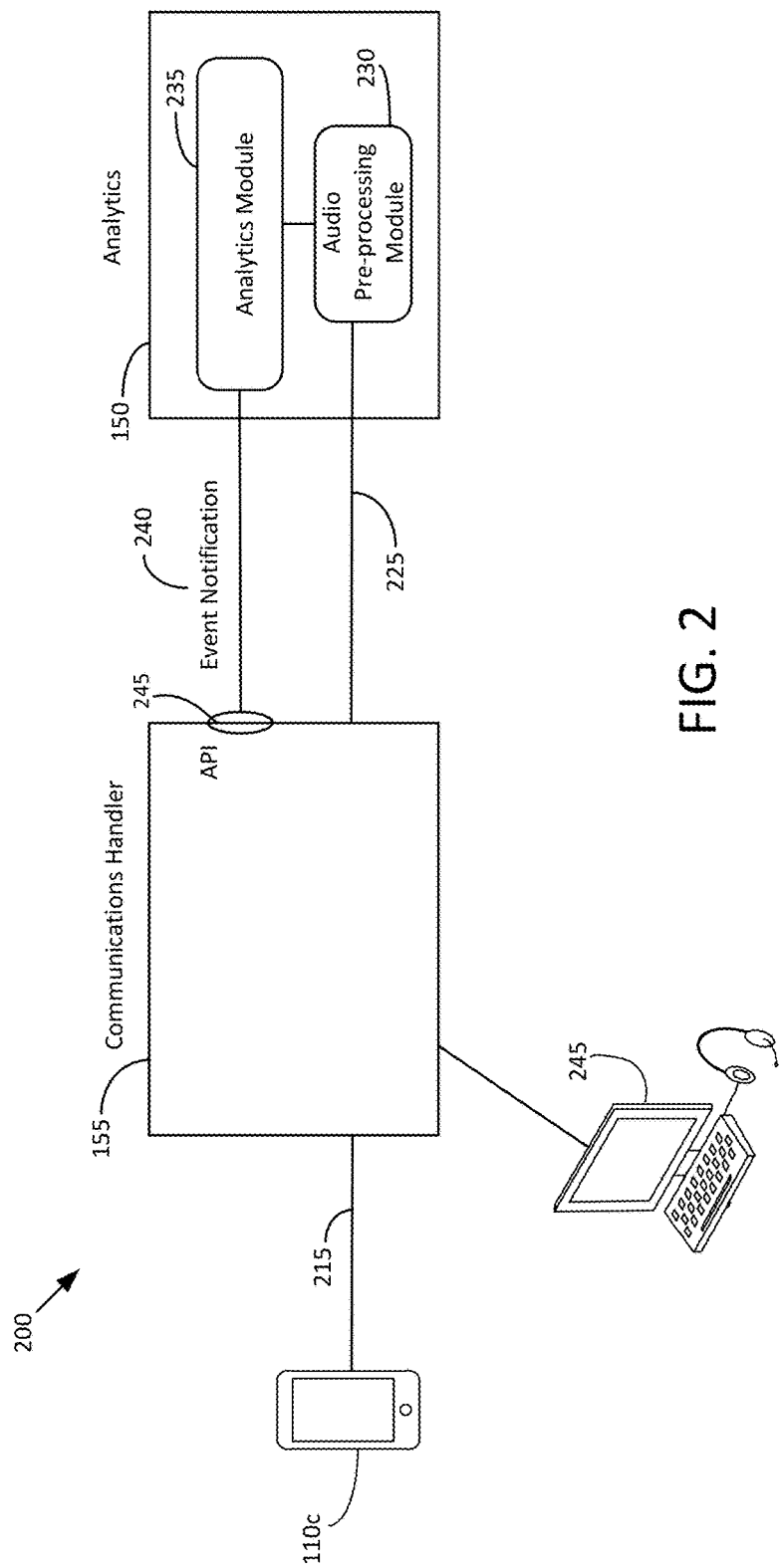
FIG. 2 shows an architecture for using a speech analytics component in conjunction with a communications handler accordingly to various embodiments.

With this in mind, an architecture 200 illustrating the use of the analytics component 150 in conjunction with the communications handler 155 according to various embodiments of the invention is shown in FIG. 2. In this instance, the communications handler 155 has been made aware of a communication to a device 110C and the communications handler 155 establishes a connection 215 to the device 110c and a connection 225 to the analytics component 150.

Accordingly, in various embodiments, the communication is forwarded to an agent for handling and the analytics component 150 is made use of to monitor and analyze the communication and detect the presence of keywords. For instance, here, the analytics component 150 shown in FIG. 2 is a speech analytics component that comprises an audio pre-processing module 230 for receiving the audio of the communication on the connection (e.g., the call leg) 225 and performing pre-processing on the audio. Depending on the embodiment, this pre-processing may involve the module 230 performing various normalizing and/or signal processing methods on the audio before providing the audio to the analytics module 235 that then processes the audio to detect keywords. For example, in particular embodiments, the audio pre-processing module 230 may break the audio into phonemes used in detecting keywords.

Accordingly, the analytics module 235 is configured to monitor the audio to detect keywords and to send event notifications to the communications handler 155 when keywords are detected. Thus, in various embodiments, the analytics module 235 is configured to read a defined set of keywords, monitor the audio for the call to detect when any of these defined keywords are present in the audio, and send event notifications to the communications handler 110 accordingly. In turn, the communications handler 155 sends the notifications to the appropriate workstation of the agent handling the communication (e.g., the phone call). As described in greater detail below, the notification is then used in various embodiments to identify a reason for the communication so that an appropriate target handle time can be assigned to the communication.

Depending on the embodiment, the analytics module 235 may be configured to execute once and operate on all incoming connections 225 together or execute and operate on each individual connection 225 separately. Therefore, in particular embodiments, the analytics module 235 is configured to perceive identification information for a connection 225 for a particular communication so that such information can be associated with keyword detection. Such association may be important because in many instances, the analytics component 150 may be monitoring a number of communications simultaneously via a number of different connections 225 and thus, it may be necessary for the analytics component 150 to be able to identify a particular connection 225 so that the component 150 can identify which communication is associated with a particular detection of a keyword.

Continuing on, the analytics component 150 communicates event notifications 240 in various embodiments to the communications handler 155 by using an application programming interface 245. Accordingly, this interface 245 may receive event notifications 240 using a LAN, WAN, bus, or other communication facility between the analytics component 150 and the communications handler 155. In addition, depending on the embodiment, the event notifications 240 may include contextual information along with information about the keyword detected by the speech analytics component 120 such as, for example, where in the audio the keyword was detected (e.g., time stamps) and for which communication. Once the communications handler 155 receives an event notification 240, the handler 155 identifies which communication is associated with the event notification 240 and forwards the notification 240 to the workstation 245 of the agent handling the communication.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 155 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 1 represents one possible configuration of a contact center architecture 100, and that variations are possible with respect to the protocols, facilities, components, technologies, and equipment used. Furthermore, those skilled in art will recognize FIG. 2 represents one possible configuration of an architecture for using an analytics component 150 in conjunction with a communications handler 155, and that variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Event Notification Module

Figure 3:
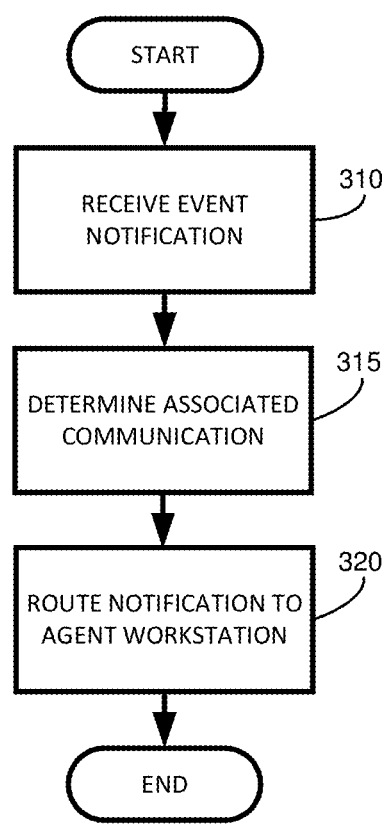
FIG. 3 illustrates a process flow for handling an event notification in accordance with various embodiments of the present invention.

Turning now to FIG. 3, additional details are provided regarding a process flow for handling an event notification according to various embodiments of the invention. In particular, FIG. 3 is a flow diagram of an event notification module for performing such functionality according to various embodiments of the invention. For example, the flow diagram shown in FIG. 3 may correspond to operations carried out by one or more processors in one or more components, such as the communications handler 155 described above, as it executes the event notification module stored in the component's volatile and/or nonvolatile memory.

As previously discussed, an analytics component 150 is "bridged" onto a communication in various embodiments so that the component 150 can analyze the communication (e.g., the audio or text of the communication) to identify keywords in the communication. Here, these keywords are to be used to identify a reason for the communication. Thus, once the analytics component 150 has identified a keyword in a particular communication, the analytics component 150 sends an event notification to the communications handler 155 identifying the keyword detected in the communication and accordingly the event notification module residing on the communications handler 155 is made aware of the event notification.

Thus, the process flow begins in FIG. 3 with the event notification module receiving the event notification in Operation 310. Accordingly, upon receiving the notification, the event notification module determines which communication is associated with the notification in Operation 315. For instance, in particular embodiments, the event notification may include information identifying the associated communication. For example, the analytics component 150 may include some type of identifier for the communication.

At this point in various embodiments, the event notification module routes the notification to the workstation of the agent handling the communication in Operation 320. As is discussed in further detail herein, the event notification is then used to identify a reason for the communication that is then used to set a target handle time for the communication.

Display Module

Figure 4:
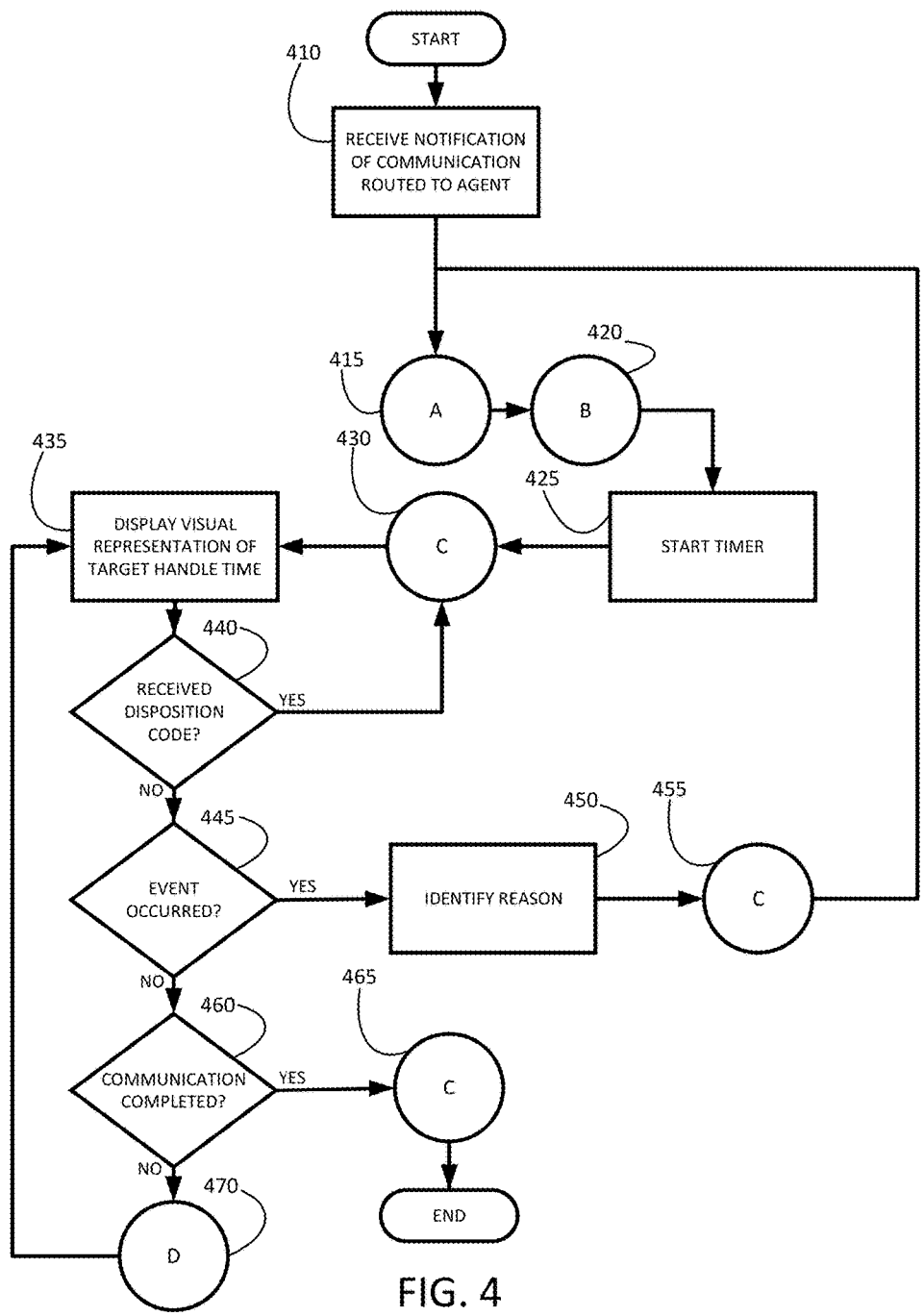
FIG. 4 illustrates a process flow for displaying a visual representation of a target handle time in accordance with various embodiments of the present invention.

Turning now to FIG. 4, additional details are provided regarding a process flow for displaying a visual representation of a target handle time (THT) according to various embodiments of the invention. In particular, FIG. 4 is a flow diagram of a display module for performing such functionality according to various embodiments of the invention. For example, the flow diagram shown in FIG. 4 may correspond to operations carried out by one or more processors in one or more components, such as an agent's workstation or the communications handler 155 described above, as it executes the display module stored in the component's volatile and/or nonvolatile memory.

The process flow for FIG. 4 begins with the display module receiving a notification of a communication routed to an agent in Operation 410. Here, the communication may be an inbound communication that was initiated by a remote party and received by the contact center or an outbound communication that was sent to a remote party. Accordingly, the communication can be received or sent via any one of a number of different channels of communication such as, for example, a voice call, an email, a chat, or a text message. For instance, the communication may have been received by the contact center from a remote party as an inbound text message by a text gateway server 140 within the contact center. Here, the text gateway server 140 may have informed the communications handler 155 of the text message and the handler 155 may have had the text message forwarded to a particular agent, resulting in the display module residing on the agent's workstation receiving a notification of the text message.

Next, the display module sets an applicable THT for the communication. To accomplish this task in various embodiments, the display module invokes a set THT module in Operation 415. In particular embodiments, the set THT module returns a default THT to the display module that is initially applicable to the communication being handled by the agent. Here, the default THT is an ideal amount of time an agent should need to handle the communication, although the default THT is not tied to the specific reason for the communication. For example, a contact center may set the default THT for all customer service calls to five minutes regardless of the reasons for the calls.

While in other embodiments, the set THT module returns a THT to the display module that is tied to a reason initially determined for the communication. For instance, the communication may be a telephone call that was routed to an IVR prior to being routed to the agent. Here, the IVR may have obtained information from the party on the call that helps to identify the reason for the call such as, for example, the party may have contacted the contact center to return an item he or she ordered online. While in another instance, the communication may be a Web chat that the party initiated on a particular webpage and the party's visit to the webpage may identify a reason for the Web chat. Yet, in another instance, the communication may be a text message or an email and some type of analysis is performed on the text of the message or email to detect keywords in the text and these keywords may identify a reason for the text message or the email. Accordingly, in these instances, the initial reason for the communication may be received along with the notification that the communication has been routed to the agent and this initial reason is then provided to the set THT module.

Continuing on, the display module in various embodiments may also set one or more characteristics for the returned THT that can assist the agent in gauging the amount of time the agent has remaining to handle the communication and still be in conformance with respect to the THT. To accomplish this task in particular embodiments, the display module invokes a characteristics module to set the one or more characteristics in Operation 420.

For example, the applicable characteristics may involve initially displaying a visual representation of the THT on the agent's workstation GUI in a first color (e.g., green) to convey to the agent he or she has ample time to handle the communication, displaying the visual representation of the THT in a second color (e.g., yellow) when a component of the visual representation has decremented below a first threshold to convey to the agent that the amount of time spent handling the communication thus far is approaching the THT, and displaying the visual representation of the THT in a third color (e.g., red) when the component of the visual representation has decremented below a second threshold (e.g., has decremented to zero or near zero) to convey to the agent that the amount of time spent handling the communication thus far is over the THT.

However, the characteristics may not necessarily be visual in other embodiments. For example, in particular embodiments, the applicable characteristics may involve the agent's workstation producing a first sound (e.g., a horn) when the component of the visual representation has decremented below the first threshold and producing a second sound (e.g., an alarm) when the component of the visual representation has decremented below the second threshold.

Next, the display module starts a timer in Operation 425. This particular operation is carried out in various embodiments so that the timer can track the amount (duration) of time the agent spends handling the communication, also known as the actual handle time. More specifically, in particular embodiments, the display module makes use of the timer to measure the amount of time the agent spends handing the communication for a particular reason. Thus, in these particular embodiments, the display module resets the timer upon a new reason for the communication being identified and the elapsed time as indicated by the timer is recorded as the actual handle time for the previous reason identified for the communication.

In addition, the display module records information for the communication. Here in particular embodiments, the display module invokes a recording module in Operation 430 to accomplish this task. Accordingly, the recording module records various information for the communication depending on the context of when the module is invoked. When a communication is first routed to the agent, the initial information to record for the communication may include a reason for the communication, if identified, and an initial THT. The elapsed time for the timer is not yet applicable since the agent has only begun to handle the communication.

At this point, the display module displays a visual representation of the applicable THT on the agent's workstation in Operation 435. The visual representation of the THT may include any number of different components depending on the embodiment that can be used to display the THT on the agent's workstation. For instance, in particular embodiments, the visual representation includes a first component that is a GUI widget such as a digital clock that displays the applicable THT as a static time (also referred to as the current THT being applied) and a second component that is a GUI widget such as a digital clock that displays the applicable THT as a dynamic time decrementing (also referred to as the decrementing THT). Here, the current THT being applied represents the amount of time allocated to the agent to handle the communication for the identified reason (if one has been identified). While the decrementing THT represents the amount of time the agent has left to handle the communication and still be in conformance. Furthermore, the visual representation may be displayed along with any applicable characteristics.

The agent begins to interact with the party on the communication and during this time, the agent can view the visual representation of the THT on his or her workstation GUI to gauge the amount of time he or she has left to handle the communication. Accordingly, several different actions may occur that the display module reacts to in various embodiments. Firstly, an event may occur that identifies a reason for the communication. More specifically, a keyword may be detected in the communication that identifies a reason for the communication. Secondly, the agent may enter a disposition code indicating an outcome for the communication. As discussed herein, in particular embodiments, the agent provides a disposition code for each reason identified for the communication. Thirdly, the communication may be completed. Here, the completion of the communication may involve the agent performing some type of wrap up work once the agent has finished interacting with the party on the communication. For example, the agent may have taken an order from the party while on the communication and he or she may need to enter additional information for the order once the agent has finish interacting with the party.

Accordingly, the display module determines whether a disposition code has been received in Operation 440. Depending on the embodiment, the agent may enter the disposition code and/or the disposition code may be automatically identified based on the occurrence of some event. For example, the agent may be handling a communication in which the party on the communication is placing an order for an item and the agent may gather credit card information from the party and enter the information to initiate a transaction to pay for the item. Accordingly, the contact center system may automatically identify a disposition code for this communication indicating an order has been processed and as a result, the display module may receive the code.

Accordingly, if the display module determines a disposition code has been received, then the display module records the disposition code in Operation 430. Again, in particular embodiments, the display module invokes the recording module to perform this task. As discussed further below, the recording module may record the disposition code so that the code is linked with the reason currently identified for the communication. In addition, the recording module may determine whether the disposition code matches (is compatible with) the reason currently identified for the communication. If the two do not match, then the recording module may adjust the THT for the reason accordingly.

Next, the display module determines whether an event has occurred (an event notification has been received) that identifies a reason for the communication in Operation 445. In various embodiments, an event identifies an instance where a keyword has been detected in the communication. When this happens, the display module is notified of the event from the communications handler 155. Accordingly, if the display module determines an event has occurred identifying a reason for the communication, then the display module may record an actual handle time corresponding to the current THT being applied in Operation 450. Again, in particular embodiments, the display module invokes the recording module to accomplish this task. Here, the current THT being applied is either a default THT or an applicable THT for a previous reason identified for the communication. Therefore, if the current THT being applied is an applicable THT for a previous reason identified for the communication, then the current time of the timer indicates the actual amount of time the agent has taken handling the communication for the previous reason and this time is recorded accordingly.

The display module then returns to Operation 415 to set an applicable THT for the communication based on the (newly) identified reason. Again, in particular embodiments, the set THT module is invoked and the identified reason is provided to the module. Accordingly, the set THT module provides an applicable THT based on the reason. In addition, the display module invokes the characteristics module in various embodiments to update the characteristics and threshold based on the new applicable THT in Operation 420.

At this point, the display module restarts the timer in Operation 425. The display module performs this operation so that the timer is now tracking the amount of time (elapsed time) spent by the agent handling the communication now that a new reason for the communication has been identified. In addition, the display module invokes the recording module in Operation 430 to record information on the newly identified reason for the communication. Specifically, the recording module records the reason identified for the communication along with the applicable THT. Finally, the display module updates the display of the visual representation on the agent's GUI with the new applicable THT and corresponding characteristics and threshold in Operation 435.

For example, the display module initially invokes the set THT module upon the agent receiving a communication. Here, a reason for the communication has not yet been identified and therefore, the visual representation is initially displayed on the agent's GUI with a THT of five minutes. Five minutes being the default THT for communications involving customer service. And more specifically, the visual representation is initially displayed on the agent's GUI with a first component showing the current THT being applied of five minutes and a second component showing the decrementing THT of five minutes that is counting down in seconds.

The agent then spends thirty seconds on the communication with the party and learns the party has contacted the contact center to check the status of an order. Accordingly, the analytics component 150 (e.g., the speech analytics component) detects a keyword identifying the reason for the call is to check the status of an order. The analytics component 150 sends an event notification to the communications handler 155 identifying the keyword indicating the reason for the call is to check the status of an order and the communications handler 155 forwards the notification to the agent's workstation and as a result, the display module is made aware of the event notification.

As a result, the display module in particular embodiments performs a "look-up" based on the detected keyword to identify a reason for the communication in Operation 450. For example, the detected keyword may have been "status" and the display module performs a query on some type of memory such as a database residing within the contact center architecture 100 (e.g., a data store 175). In turn, the query returns a result that indicates the reason for the communication is to check the status of an order.

Accordingly, the display module then invokes the set THT module a second time and the set THT module determines the applicable THT for a communication involving checking the status of an order is two minutes. Here, in particular embodiments, the set THT module adjusts the applicable THT to one minute and thirty seconds by subtracting the thirty seconds that have already elapsed on the communication because the original THT displayed on the agent's GUI was a default THT. Therefore, the set THT module returns a THT of two minutes as the current THT being applied and an adjusted THT of one minute and thirty seconds as the decrementing THT.

Accordingly, the display module updates the visual representation of the THT provided on the agent's GUI to display a current THT being applied of two minutes and a decrementing THT of one minute and thirty second in Operation 435. As a result of the update, the visual representation of the THT now represents a more accurate THT for the task to be completed by the agent for the communication and provides the contact center with a more accurate assessment on whether the agent is compliant or not on the communication with respect to handle time.

At this point, the agent continues to interact with the party on the communication to provide the party with the status of the party's order. Therefore, during this time, the display module determines a disposition code has not been received in Operation 440, an event identifying a reason for the communication has not occurred in Operation 445, and the communication has not ended in Operation 460. As a result, the display module then decrements the visual representation of the THT in Operation 470. Here, in particular embodiments, the display module invokes a decrement module configured to decrement the visual representation of the THT, and more specifically decrement the decrementing THT component of the visual representation, displayed on the agent's workstation. Accordingly, the display module returns to Operation 435 to update the visual representation of the THT on the agent's GUI to display the decrement.

At some point the display module determines the agent has entered a disposition code in Operation 440 for the communication and the module then records the disposition code in Operation 430. At some point, the communication is ended and the display module detects such in Operation 460 and records an actual handle time corresponding to the current THT being applied when the communication ended in Operation 465. Again, in particular embodiments, the display module invokes the recording module to accomplish this task. At this point the process flow is ended.

Depending on the circumstances, the communication may be ended based on a number of different actions. For instance, the agent may perform wrap up work for the communication and after finishing the wrap up work, signal that he or she is available to handle another communication. While in other instances, the channel being used for the communication may be terminated indicating the communication has ended. For example, the agent may be conducting a Web chat with a party and the agent and/or party may exit the chat indicating the communication has ended. Those of ordinary skill in the art can envision other actions that can signal the end of the communication in light of this disclosure.

Thus, the process flow depicted in FIG. 4 and described above allows for THTs to be applied to communications in various embodiments that are more accurate with respect to the amount of time agents fielding these communications should ideally take to handle the communications over THTs provided via conventional practices used in the industry today. In addition, the visual representation of these THTs displayed to agents in various embodiments provides the agents with a mechanism that allows them to actively monitor how well they are performing with respect to time allocated to handling the associated communications. That is to say, the visual representation of these THTs displayed to agents in various embodiments provides the agents with a mechanism that allows the agents to actively monitor their efficiency at handling the associated communications. Furthermore, the more accurate THTs provided for communications in various embodiments allow the contact center to not only better assess agent efficiency, but also to better assess the efficiency of various systems and processes within the contact center environment.

Of further note, the process flow depicted in FIG. 4 and described above is configured to allow for more than one reason to be identified for a communication. For instance, an agent may be on a phone call with a party who has called to return an item. Initially, a keyword may be detected that identifies the agent is assisting the party with the return. However, later in the call, the party may decide to place a new order for a different item. Therefore, the reason for the call has now shifted from returning an item to placing an order. Accordingly, a second keyword may be detected that identifies the agent is assisting the party with placing an order.

Here, depending on the embodiment, the display module may be configured to simply replace the initially selected reason for the call with the newly selected reason for the call or to account for both selected reasons. The same may hold true with respect to the applicable THT. Depending on the embodiment, the display module may be configured to simply replace the THT applicable to the initially selected reason with the THT applicable to the newly selected reason or be configured to account for both THTs.

For instance, the display module may set the applicable THT to five minutes based on an event notification initially identifying a reason for the call indicating the party has called to return an item. Later during the call, a second event notification may identify a new reason for the call involving the party wishing to place a new order for a different item. In response, the display module in particular embodiments simply replaces the initially identified reason for the call with the newly identified reason for the call and replaces the applicable THT of five minutes with an applicable THT of ten minutes based on the reason for the call now being to place an order.

However, in other embodiments, the display module may instead account for both identified reasons for the call and their corresponding applicable THTs. In these particular embodiments, the display module does not replace the initially-determined applicable THT of five minutes with the later-determined applicable THT of ten minutes. Instead, the display module treats each THT separately in order to recognize the party may have contacted the contact center for more than one reason. As a result, the agent handling the call may be given a total of fifteen minutes to handle the communication and still be in conformance instead of just ten minutes had the display module simply replaced the initially identified reason for the call and corresponding applicable THT with the newly identified reason for the call and corresponding applicable THT. Accordingly, in particular embodiments, a disposition code may also be provided for each reason identified for the communication.

Set THT Module

Figure 5:
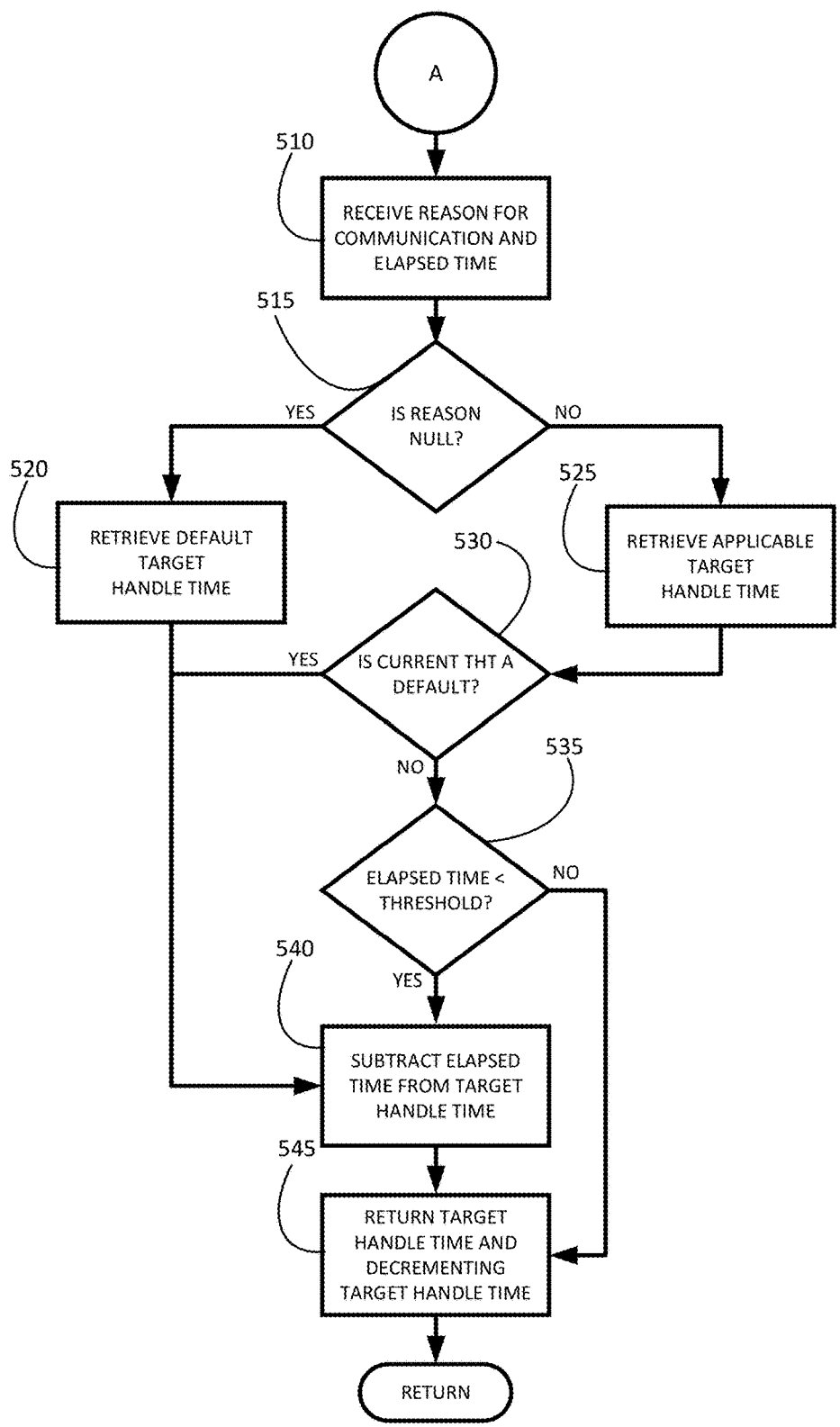
FIG. 5 illustrates a process flow for setting an applicable target handle time in accordance with various embodiments of the present invention.

Turning now to FIG. 5, additional details are provided regarding a process flow for setting an applicable THT for a particular communication according to various embodiments of the invention. In particular, FIG. 5 is a flow diagram showing a set THT module for performing such functionality according to various embodiments of the invention. For example, the flow diagram shown in FIG. 5 may correspond to operations carried out by one or more processors in one or more components, such as, for example, an agent's workstation or the communications handler 155 described above, as it executes the set THT module stored in the component's volatile and/or nonvolatile memory.

As previously discussed, the set THT module is invoked by the display module in various embodiments to provide an applicable THT for displaying on an agent's GUI while the agent is handling a communication. Accordingly, the process flow begins with the set THT module receiving a reason for the communication, an indication of whether the current THT being applied to the communication is a default THT, and an elapsed time in Operation 510. Here, the information can be provided by the display module to the set THT module or the set THT module may retrieve the information from some form of memory. For example, such information may be stored temporarily in volatile memory on the agent's workstation.

The set THT module then makes a determination in Operation 515 whether the reason provided in the information is null. A null reason indicates one has not yet been identified for the communication. Thus, the applicable THT at this point in the communication is a default THT. Therefore, if the set THT module determines the reason provide in the information is null, then the set THT module retrieve a default THT in Operation 520. For example, in particular embodiments, the set THT module queries the default THT for the communication from some type of memory such as a database residing within the contact center architecture 100 (e.g., a data store 175).

However, if the set THT module instead determines the reason provided in the information is not null, then the set THT module retrieves the applicable THT based on the reason provided in the information in Operation 525. Again, in particular embodiments, the set THT module queries the applicable THT for the communication based on the reason from some type of memory such as a database residing within the contact center architecture 100.

At this point, the set THT module determines whether the current THT being applied to the communication is a default in Operation 530. For instance, in particular embodiments, the set THT module may determine a reason has not previously been identified (recorded) for the communication and therefore the current THT being applied to the communication is a default.

As the reader may recall, the applicable THT may need to be adjusted under certain circumstances to account for time the agent has already spent on the communication. For example, the agent may have received a communication and interacted with the party on the communication for a few seconds (e.g., twenty seconds) before a reason is identified for the communication and during this time, a default THT may have been displayed on the agent's GUI. Therefore, under these circumstances, the applicable THT may need to be adjusted to account for this time that has already elapsed (e.g., to account for the twenty seconds the agent has already spent handling the communication).

Therefore, if the set THT module determines the current THT being applied to the communication is a default, then the set THT module adjusts the retrieved THT by subtracting the elapsed time provided in the information from the retrieved THT in Operation 540. This adjusted THT is then used as the decrementing THT for the visual representation of the THT displayed on the agent's GUI.

However, other circumstances may not warrant adjusting the THT to account for the elapsed time. For example, a reason may initially be identified for a communication being handled by an agent that the communication is to check the status of an existing order. However, as the communication continues, the party may decide to place a new order for a product as well. As a result, a new reason may be identified for the communication that indicates the party would now like to place a new order. Here, the contact center may want to provide the agent with the appropriate THT without accounting for any time (docking any time) that has elapsed up to that point in the communication since the new reason for the communication indicates (signals) the agent is handling more than one matter for the communication. Therefore, in this instance, no time is subtracted from the retrieved THT.

Accordingly, in particular embodiments, the set THT module determines whether the elapsed time received is less than a threshold in Operation 535. Here, the threshold can be set at a number of different amounts of time depending on the embodiment. The reason for this determination is that a low elapsed time may indicate the previous reason identified for the communication may have been mistakenly identified and therefore, any time that has elapsed between the previous reason's identification and the current reason's identification should be docked from the THT for the current reason.

For example, the analytics component 150 may have initially identified a keyword that signaled a particular reason for the communication. However, as the party and agent interact on the communication, the analytics component 150 quickly identified a second keyword that signals a different reason for the communication. Here, the time that has elapsed between the two keywords may have been six seconds and the threshold in Operation 535 may be set at fifteen seconds. Therefore, in this example, the set THT module would subtract the six seconds from the retrieved THT in Operation 540 to arrive at the decrementing THT.

However, if the elapsed time is over the threshold, then the set THT module assumes the elapsed time is the amount of time the agent spent handling the previous reason for the communication. Therefore, the set THT module would not subtract the elapsed time from the retrieve THT and would simply return the same value (the retrieved THT) for both the THT to be currently apply to the communication and the decrementing THT.

Thus, once the set THT module has retrieved the applicable THT and has made any necessary adjustments to arrive at the decrementing THT, the set THT module returns the applicable THT as the current THT being applied to the communication and the adjusted THT as the decrementing THT to the display module in Operation 545. As a result, the display module may then display the returned current THT being applied and decrementing THT for the visual representation provided on the agent's GUI.

Characteristics Module

Figure 6:
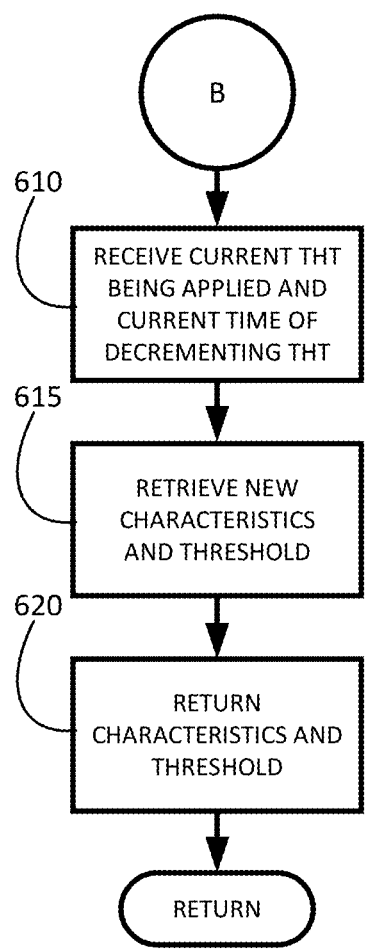
FIG. 6 illustrates a process flow for setting characteristics and a threshold for a visual representation of a target handle time in accordance with various embodiments of the present invention.

Turning now to FIG. 6, additional details are provided regarding a process flow for setting characteristics and a threshold for the visual representation of the THT displayed to an agent according to various embodiments of the invention. In particular, FIG. 6 is a flow diagram showing a characteristics module for performing such functionality according to various embodiments of the invention. For example, the flow diagram shown in FIG. 6 may correspond to operations carried out by one or more processors in one or more components, such as, for example, an agent's workstation or the communications handler 155 described above, as it executes the characteristics module stored in the component's volatile and/or nonvolatile memory.

As previously discussed, the characteristics module is also invoked by the display module (as well as the decrement module as discussed below) in various embodiments to provide applicable characteristics and/or a threshold for the visual representation of the THT being displaying on an agent's GUI while the agent is handling a communication. Accordingly, the process flow begins with the characteristics module receiving the current THT being applied and the current time of the decrementing THT in Operation 610. Again, the current THT being applied and the current time of the decrementing THT may be provided by the display module or the decrement module to the characteristics module or the characteristics module may retrieve this information from some form of memory such as, for example, volatile memory within the agent's workstation.

Accordingly, the characteristics module retrieves new characteristics and/or a threshold that are now applicable to the visual representation of the THT in Operation 615. Here, in various embodiments, the characteristics module is configured to make use of the current THT being applied and the current time of the decrementing THT to identify what new characteristics and/or threshold are now applicable to the visual representation of the THT being displayed on the agent's GUI. For instance, in particular embodiments, the characteristics module retrieves the new characteristics and/or threshold now applicable to the visual representation in Operation 615 by querying some type of memory such as a database, for example, residing within the contact center architecture 100 (e.g., a data store 175) based on the current THT being applied and the current time of the decrementing THT received by the characteristics module.

For example, the visual representation may be displaying a current THT being applied of three minutes and a decrementing THT of one minute and twenty-nine seconds. Here, the current characteristic that is being applied to the visual representation is displaying the visual representation in green and the current threshold being monitored is one minute and thirty seconds. Therefore, the decrementing THT has fallen below the threshold in this example and accordingly, the decrement module (as discussed below) invokes the characteristics module and passes along the current THT being applied of three minutes and the current time of the decrementing THT of one minute and twenty-nine seconds.

In turn, the characteristics module queries a database storing information on various characteristics and thresholds that are dependent upon the current THT being applied and the current time of the decrementing THT. Here, when the current THT being applied is equal to three minutes, the applicable characteristics involve displaying the visual representation initially in green until the time of the decrementing THT falls below a first threshold of one minute and thirty seconds. At that point, the applicable characteristics involve displaying the visual representation in yellow until the time of the decrementing THT falls below a second threshold of one second (in other words, falls to zero). At that point, the applicable characteristics involve displaying the visual representation in red. Therefore, in the example, the characteristics module queries the database and the characteristic yellow is returned along with a threshold of one second.

At this point, the characteristics module returns the now applicable characteristics and threshold in Operation 620. Accordingly, the visual representation of the THT being displayed on the agent's GUI is updated to reflect the now applicable characteristic of yellow and the now applicable threshold of one second is monitored.

It is noted that in other embodiments, the characteristics module may retrieve the now applicable characteristics and/or threshold based on other information besides the THT currently being applied and the current time of the decrementing THT. For instance, in particular embodiments, the characteristics module may use information such as the characteristics that are currently being applied to the visual representation and/or the threshold currently being monitored in addition to or instead of the current THT being applied and the current time of the decrementing THT. Those of ordinary skill in the art may be able to envision other information that the characteristics module may use in retrieving the now applicable characteristics and/or threshold in light of this disclosure.

Recording Module

Figure 7:
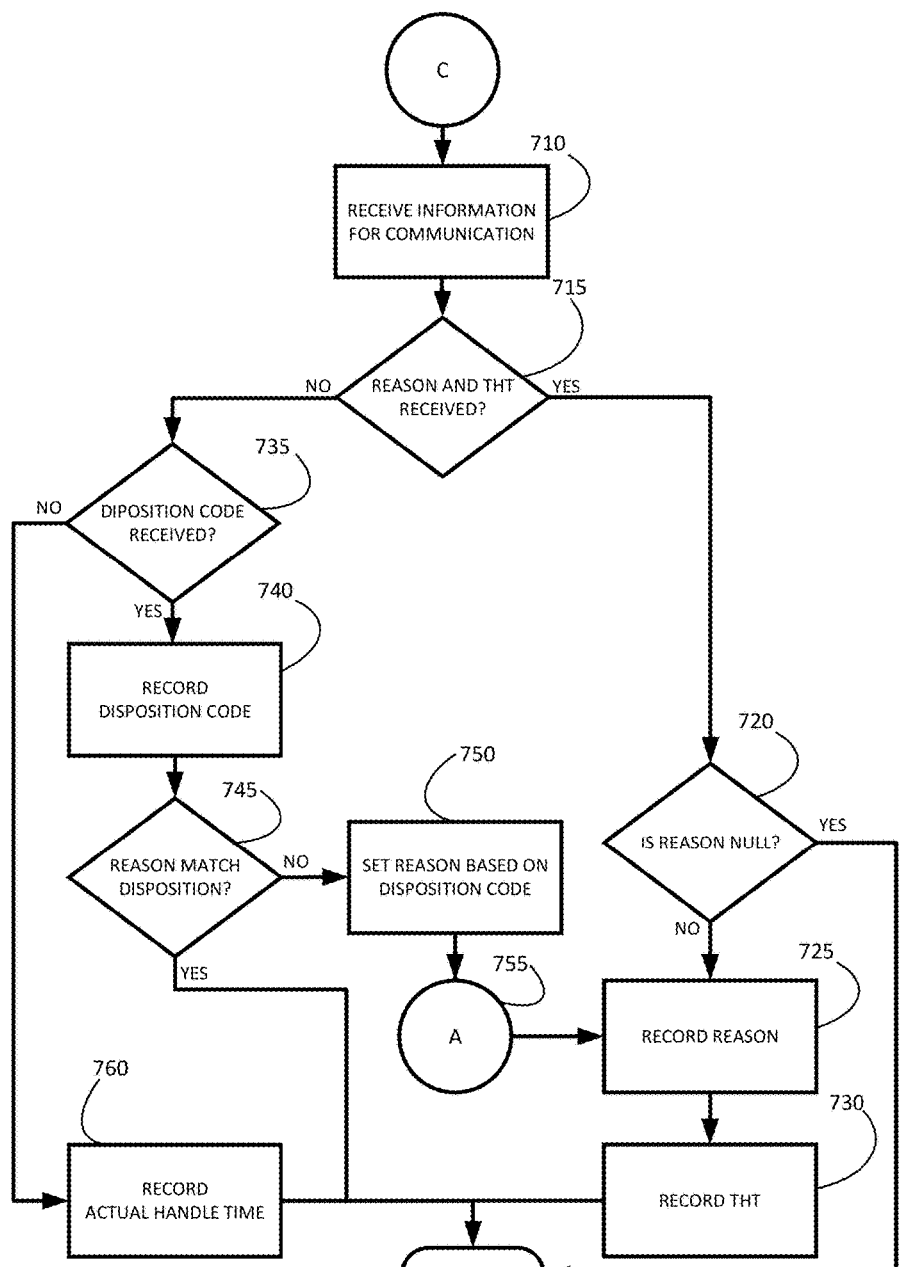
FIG. 7 illustrates a process flow for recording information for a communication in accordance with various embodiments of the present invention.

Turning now to FIG. 7, additional details are provided regarding a process flow for recording information for a communication according to various embodiments of the invention. In particular, FIG. 7 is a flow diagram showing a recording module for performing such functionality according to various embodiments of the invention. For example, the flow diagram shown in FIG. 7 may correspond to operations carried out by one or more processors in one or more components, such as, for example, an agent's workstation or the communications handler 155 described above, as it executes the recording module stored in the component's volatile and/or nonvolatile memory.

Accordingly, the process flow begins with the recording module receiving information about the communication in Operation 710. As previously discussed, the display module invokes the recording module at various times during a communication to record information for the communication. Here, depending on the circumstances, the information may include one or more items such as a reason for the communication, a disposition code, a current time for the timer, a current THT being applied to the communication, and/or a decremented THT. In addition, the display module may provide the recording module with the information to store or the recording module may retrieve this information from some form of memory such as, for example, volatile memory within the agent's workstation.

In Operation 715, the recording module determines whether the received information includes a reason for the communication and a corresponding THT. If such information has been included in the received information, then the recording module determines whether the reason for the communication is null in Operation 720. Here, a null reason indicates the corresponding THT is a default THT and should not be recorded. Accordingly, if the recording module determines the reason is null, then the module simply returns to the display module.

However, if the recording module determines the reason is not null, then the recording module records the reason in Operation 725 and the corresponding THT in Operation 730. Here, in particular embodiments, the reason and corresponding THT are associated with one another (linked). For example, the reason and corresponding THT may be recorded as two different fields for a record stored in a database table. In addition, in particular embodiments, the reason and corresponding THT are associated with the communication. Furthermore, in particular embodiments, a time stamp may be recorded along with the reason and corresponding THT as an indication where the particular reason was being handled during the communication.

However, if the received information does not include a reason and THT, then the recording module determines whether the received information includes a disposition code in Operation 735. If so, then the recording module records the disposition code in Operation 740. Here, in particular embodiments, the disposition code is associated (linked) with the reason recorded for the communication with the earliest time stamp and without a disposition code already linked to the reason. If a reason has not been recorded for the communication, then the recording module in particular embodiments sets a reason based on the disposition code and records the reason along with the disposition code.

At this point, the recording module determines whether the corresponding reason matches the disposition code in Operation 745. If the recording module determines the corresponding reason does not match the disposition code, then the recording module sets the reason based on the disposition code in Operation 750. For instance, returning to the example, the recording module sets the reason to check on the status of an order to match the disposition code indicating requested information was provided to the party. In addition, the recording module invokes the set THT module in Operation 555 to retrieve the applicable THT for the newly set reason. Accordingly, the recording module then records the new reason and retrieved THT for the disposition code in Operations 725 and 730.

Returning to Operation 735, if the recording module instead determines the received information does not include a disposition code, then the received information must include the current time of the timer. Accordingly, the recording module records the current time of the timer as the actual handle time for the reason in Operation 760. Here, in particular embodiments, the recording module associates (links) the actual handle time to the most recent reason recorded for the communication. If a reason has not been recorded for the communication, then the recording module simply ignores the current time of the timer.

An example is now provided to facilitate better understanding of the recording module. Accordingly, this example should be understood as only an example and should not be construed to limit the scope of the invention. A party places a phone call to a contact center to initially inquire about product information on a particular item the party viewed on a website. The phone call is answered by the contact center and forwarded to an available agent.

As a result, the display module initially sets the applicable THT to a default of five minutes, begins the timer, and invokes the recording module. In this instance, since the current THT being applied is a default THT, then the reason for the communication is null. Accordingly, the recording module does not record the default THT for the communication.

Figure 8:
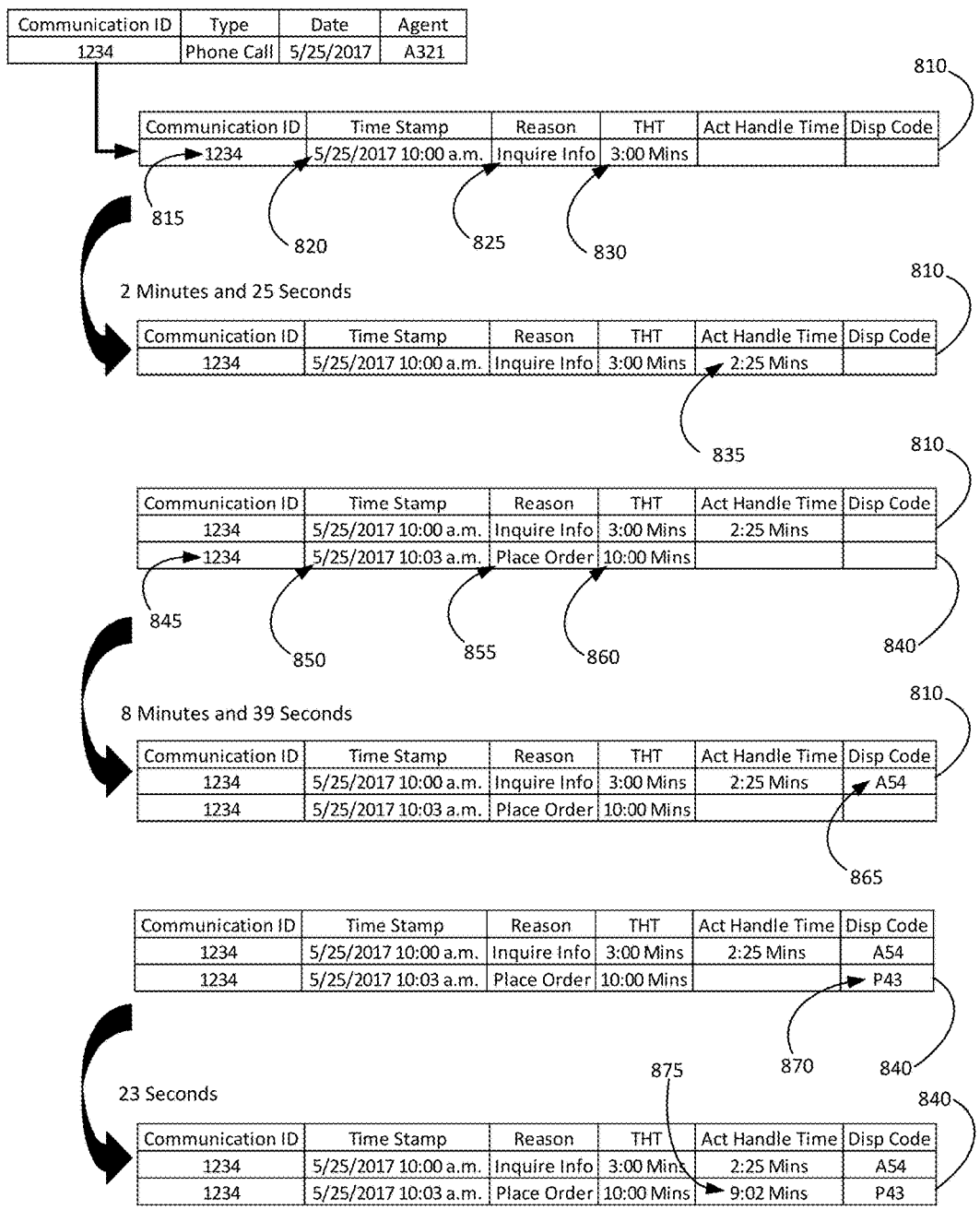
FIG. 8 illustrates an example of data records storing information for a communication in accordance with various embodiments of the present invention.

The agent begins to converse with the party on the call and after ten seconds, a keyword is identified in the conversation between the agent and the party that indicates the reason for the communication is the party has called to inquire about product information for an item. As a result, the display module sets the applicable THT for this reason of three minutes as the current THT being applied to the communication and sets a corresponding decrementing THT of two minutes and fifty seconds. The display module invokes the recording module and the recording module records the identified reason and applicable THT for the communication in a single record 810 as shown in FIG. 8. Specifically, the recording module records a single record with an identifier of 1234 815 identifying the communication, a time stamp of May 25, 2017 10:00 a.m. 820, a reason of "inquire info" 825, and a THT of 3:00 minutes 830.

Later on during the call (after another 2 minutes and 15 seconds), the party decides to place an order for the item and a second keyword is detected identifying a second reason for the communication of placing an order. Accordingly, the display module first invokes the recording module upon detecting the new reason for the communication and provides the recording module with the current time of the timer, which is two minutes and twenty-five seconds. As a result, the recording module records an actual handle time of 2:25 minutes 835 for the first reason.

The display module then sets the applicable THT for the second reason to ten minutes as the current THT being applied to communication, sets a corresponding decrementing THT of ten minutes as well, and restarts the timer. The display module invokes the recording module to record the current THT being applied and the decrementing THT for the communication. As a result, the recording module records a second record 840 with the identifier of 1234 845 identifying the communication, a time stamp of May 25, 2017 10:03 a.m. 850, a reason of "place order" 655, and a THT of 10:00 minutes 860.

Accordingly, the agent assists the party with placing the order for the item and ends the call with the party after eight minutes and thirty-nine seconds. At this point, the agent finishes up any necessary wrap up work for the call which includes providing a disposition code for each reason identified for the call. Here, the agent brings up a GUI on his workstation that lists the two reasons and provides a mechanism to record a disposition code for each reason. The agent selects a disposition code for the first reason and the display module invokes the recording module to record the disposition code. In turn, the recording module records the disposition code 865 for the reason (the record) with the earliest time stamp without a disposition code. Therefore, the recording module records the disposition code for the first record 810.

The agent then selects a disposition code for the second reason and again, the display module invokes the recording module to record the disposition code. In turn, the recording module records the disposition code 870 for the second record 840. It is also noted the recording module ensures the disposition code entered for each reason matches the corresponding reason.

Finally, once the agent has completed the necessary wrap up work for the call, the agent indicates he is available to handle another communication by placing himself in the "available" state. Therefore, the display module recognizes the phone call has been completed and invokes the recording module one last time to record the actual handle time for the second reason identified for the call. Here, the wrap up work has taken up twenty-three seconds so that the timer now has a current time of nine minutes and two seconds. Accordingly, the recording module records an actual handle time of 9:02 Mins 875 for the second record 840.

Decrement Module

Figure 9:
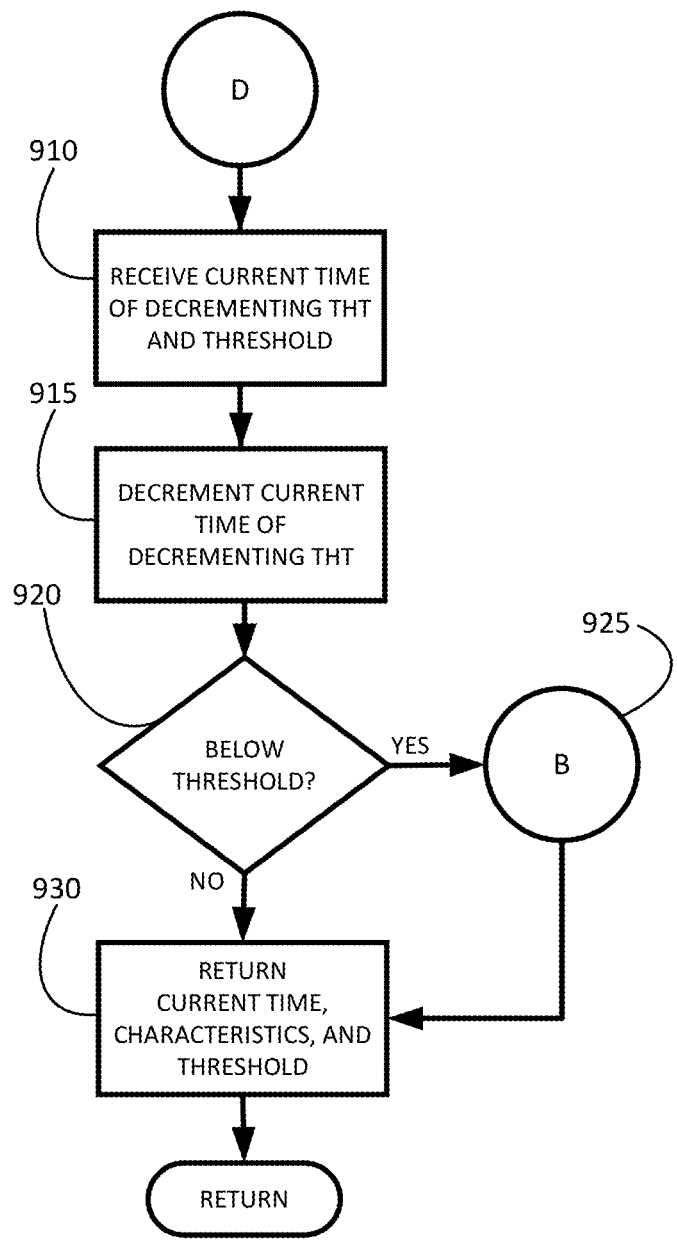
FIG. 9 illustrates a process flow for decrementing a component shown for a visual representation of a target handle time in accordance with various embodiments of the present invention.

Turning now to FIG. 9, additional details are provided regarding a process flow for decrementing the THT shown for the visual representation displayed to an agent according to various embodiments of the invention. In particular, FIG. 9 is a flow diagram showing a decrement module for performing such functionality according to various embodiments of the invention. For example, the flow diagram shown in FIG. 9 may correspond to operations carried out by one or more processors in one or more components, such as, for example, an agent's workstation or the communications handler 155 described above, as it executes the decrement module stored in the component's volatile and/or nonvolatile memory.

As previously discussed, the decrement module is also invoked by the display module in various embodiments to decrement the THT shown for the visual representation being displaying on an agent's GUI while the agent is handling a communication. Accordingly, the process flow begins with the decrement module receiving the current THT being applied, the current time of the decrementing THT being displayed, and the applicable threshold in Operation 910. Again, the current THT being applied, the current time of the decrementing THT, and the threshold may be provided by the display module to the decrement module or the decrement module may retrieve this information from some form of memory such as, for example, volatile memory within the agent's workstation.

Accordingly, the decrement module decrements the current time of the decrementing THT in Operation 915. That is to say, in various embodiments, the decrement module decrements the current time of the decrementing THT by one second. However with that said, the amount of decrement may vary depending on the speed at which the decrement module executes. Therefore, in particular embodiments, the decrement may be more than one second.

At this point, the decrement module determines whether the current time of the decrementing THT, once decremented by the module, is below the threshold that is currently applicable in Operation 920. For example, the current time of the decrementing THT may be two minutes and fourteen seconds, once decremented by the module, and the threshold may be currently set at two minutes and fifteen seconds. Therefore, the decrement module in this example would determine the current time of the decrementing THT is below the threshold in Operation 920.

As a result, the decrement module invokes the characteristics module in various embodiments to update any applicable characteristics and the threshold in Operation 925. As discussed above, the characteristics module determines the applicable characteristics and threshold based on information such as, for example, the current THT being applied, the current time of the decrementing THT, the current characteristics being applied, and/or the current threshold being applied. Accordingly, the characteristics module returns the applicable characteristics and threshold to the decrement module and in turn, the decrement module returns the current time of the decrementing THT and the applicable characteristics and threshold in Operation 930. However, if the current time of the decrementing THT is not below the threshold, then the decrement module simply returns the current time of the decrementing THT to the display module in Operation 930.

Analytics Module

Figure 10:
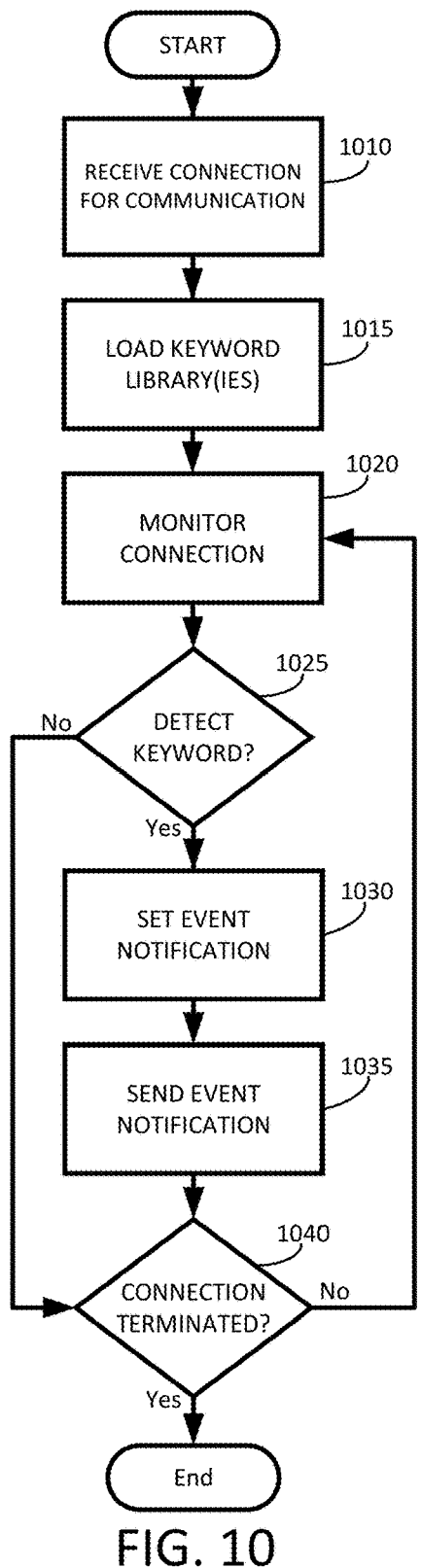
FIG. 10 illustrates a process flow for analyzing a communication in accordance with various embodiments of the present invention.

Turning now to FIG. 10, additional details are provided regarding a process flow for analyzing a communication to identify keywords according to various embodiments of the invention. In particular, FIG. 10 is a flow diagram showing an analytics module for performing such functionality according to various embodiments of the invention. For example, the flow diagram shown in FIG. 10 may correspond to operations carried out by one or more processors in one or more components, such as, for example, the analytics component 150 described above, as it executes the analytics module stored in the component's volatile and/or nonvolatile memory.

As the reader may recall, the analytics component 150 may conduct various types of analytics on the communication depending on the channel of communication being used. For instance, if the communication is a telephone call, then the analytics component 150 is configured to perform speech analytics on the audio of the phone call. While if the communication is an exchange of text messages or chat messages, then the analytics component 150 is configured to perform text recognition on the text of the messages such as full-text search or OCR. For instance, in particular embodiments, the analytics component performs a full-text search by first scanning the text of all the text or Web chat messages and building a list of search terms (often called an index, but more correctly named a concordance). Then, the analytics component only references the index when attempting to identify keywords, rather than the text of the original messages. In particular instances, the analytics component may be configured to build the index by ignoring words, such as "the" and "and," that are both common and insufficiently meaningful to be useful in searching. In addition, the analytics component may also employ language-specific stemming on the words being indexed. For example, the words "drives," "drove," and "driven" may be recorded in the index under the single concept word "drive."

Accordingly, the process flow begins with the analytics module receiving a connection for a communication in Operation 1010. For instance, if the communication is a telephone call, then the analytics module is bridged onto a call leg for the phone call so that the analytics module can listen in on the audio of the phone call. However, if the communication involves some type of non-voice channel such as text messages or chat messages, then the analytics module is connected to some type of network so that the messages can also be directed to the analytics component 150.

Next, the analytics module loads the appropriate keyword library(ies) in Operation 1015. In particular embodiments, the analytics module may also receive information along with the connection to the communication that identifies the type of communication being conducted and/or an initial reason for the communication. For instance, the information may indicate the communication involves a call placed to customer service. Accordingly, the analytics module then loads the keyword library(ies) associated with customer service. Here, the loaded library(ies) include the keywords that are relevant to the type of communication identified. These are the keywords that the analytics module monitors for in the communication.

Therefore, once the appropriate library(ies) has been loaded, the analytics module monitors the connection to the communication in Operation 1020. Accordingly, the analytics module then determines whether a keyword from the library(ies) has been detected in the communication in Operation 1025. If so, then the analytics module sets an event notification in Operation 1030 and sends the event notification to the communications handler 155 in Operation 1035. Here, the event notification provides information such as the keyword detected in the communication and identifies the communication so that the communications handler 155 can determine which agent workstation to send the event notification to.

However, if the analytics module determines a keyword has not been detected, then the analytics module checks to see if the connection with the communication has been terminated in Operation 1040. In particular embodiments, the communications handler 155 terminates the connection for the communication upon detecting the communication has been terminated between the party and the agent. For instance, the communications handler 155 terminates the call leg for a call being used by the analytics component 150 to monitor the audio of the call upon the party and agent on the call hanging up and ending the call.

If the analytics module determines the connection has been terminated, then the analytics module simply ends the process for the communication. However, if the analytics module determines the connection has not been terminated, then the analytics module returns to Operation 1025 and continues to monitor the communication.

Tagging Module

Figure 11:
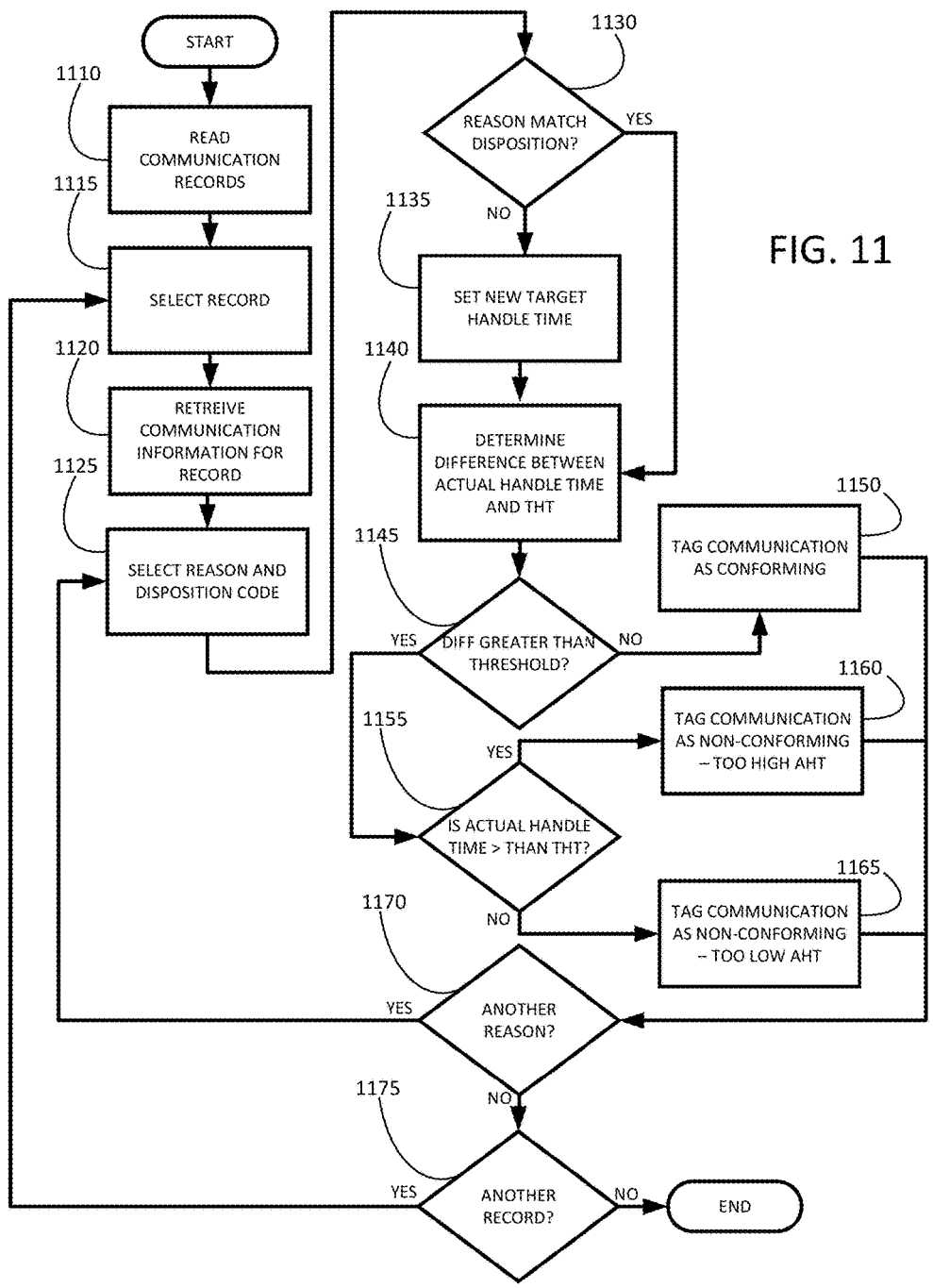
FIG. 11 illustrates a process flow for identifying certain occurrences of actual handle times for communications in accordance with various embodiments of the present invention.

Turning now to FIG. 11, additional details are provided regarding a process flow for identifying certain occurrences of handle time for communications according to various embodiments of the invention. In particular, FIG. 11 is a flow diagram showing a tagging module for performing such functionality according to various embodiments of the invention. For example, the flow diagram shown in FIG. 11 may correspond to operations carried out by one or more processors in one or more components, such as, for example, the communications handler 155 described above, as it executes the tagging module stored in the component's volatile and/or nonvolatile memory.

As previously discussed, information for a communication may be recorded during the time the communication is handled in various embodiments. Here, the information may include various data such as, for example, the reason(s) identified for the communication, the applicable THT(s) based on the reason(s), the actual handle time(s) for the reasons, the disposition code(s) for the communication, etc. Accordingly, a contact center may analyze such information to control the routing of communications based on how well agents are adhering to THTs. In addition, a contact center may analyze such information to identify deficiencies within the contact center and address these deficiencies to improve the efficiency at which the contact center operates. Thus, in particular embodiments, a contact center may make use of the tagging module to identify communications involving non-conforming performances.

Here, the process flow begins with the tagging module reading the records of one or more communications in Operation 1110. For instance, the tagging module may read the records for inbound telephone calls received during a particular timeframe (such as a turn or a work day) and/or by a particular group of agents within the contact center (such as a customer service workgroup or a technical support workgroup). Thus, each record identifies a communication that was handle during the particular timeframe and/or by the particular group of agents.

Next, the tagging module selects a first record from the read records in Operation 1115 and retrieves the communication information recorded for the record in Operation 1120. In particular embodiments, the communication information may have been retrieved along with the communication records in Operation 1115 and therefore the Operation 1120 to read the communication information may not be necessary.

As previously discussed, the display module in particular embodiments may be configured to identify more than one reason for a communication during the communication. Likewise, the display module may be configured to allow the same for disposition codes. Therefore, the communication information for a particular communication may include multiple reasons for the communication along with corresponding disposition codes.

For example, an agent may have fielded a communication involving a party contacting the contact center to return an item ordered online. Here, the reason for the communication may have initially been identified as returning an item. The agent assists the party in returning the item and once this task had been completed, the party decides to also go ahead and place a new order for another item. At this point, the reason for the communication has changed from returning an item to placing an order for an item. This second reason for the communication may have been identified based on the detection of a second event. Again, the agent assists the party in placing the new order for the item. At the conclusion of the communication, the agent selects a disposition code for each reason identified during the communication and this information is stored. As a result, the communication information retrieved by the tagging module in this example would include two different reasons for the communication along with a corresponding disposition code for each reason.

Thus, returning to FIG. 11, the tagging module selects the first reason and corresponding disposition code provided in the communication information for the selected communication record in Operation 1125. Next, the tagging module determines whether the reason matches the disposition code in Operation 1130 similar to the recording module discussed above. Accordingly, if the tagging module determines the reason identified for the communication does not match the disposition code, then the tagging module sets a new THT for the communication in Operation 1135 to match the disposition code entered for the communication.

Here, the tagging module may be performing the operations associated with checking whether the reason matches the disposition code as a second check to the recording module or as an only check to ensure the reason matches the disposition code depending on the embodiments of the recording and tagging modules being utilized by a contact center. In other words, in particular embodiments, the recording module may not be configured to perform this check and instead, leaves this check to be performed by the tagging module. While in other embodiments, the tagging module may not be configured to perform this check and instead, leaves this check to be performed by the recording module. While yet in other embodiments, both the recording module and the tagging module may be configured to perform the check.

Continuing on, the tagging module next determines the difference between the actual handle time and the THT in Operation 1140. For example, in a particular communication, an agent may have spent three minutes and thirty-seven seconds to assist a party with checking on the status of an order. Here, the THT applied to this reason is three minutes. Therefore, in this example, the tagging module determines the difference between actual handle time and the THT for this reason is thirty-seven seconds.

At this point, the tagging module determines whether the difference warrants tagging the communication as an occurrence where the actual handle time is out of conformance with respect to adhering to the THT applied. Here, the contact center in various embodiments may define one or more thresholds at which communications should be tagged as out of conformance. For instance, returning to the example, the contact center may define a threshold of twenty percent of the THT at which communications should be tagged. The threshold serves to identify communications in which the actual handle times were considered by the contact center to be significantly out of conformance with respect to adhering to the THTs. Accordingly, the tagging module determines whether the difference is greater than the threshold in Operation 1145.

Therefore, turning to the example, the tagging module determines whether the difference (thirty-seven seconds) is greater than twenty percent of the THT (three minutes). In other words, the tagging module determines whether 37 seconds is greater than 20% of 180 seconds. Here, the difference is roughly twenty-one percent of the THT. Thus, the tagging module determines in Operation 1145 that the communication warrants tagging as out of conformance. Had the tagging module determined instead that the communication does not warrant being tagged as out of conformance, then the tagging module in various embodiments tags the communication as an occurrence considered in conformance in Operation 1150.

However, since the tagging module has determined the communication should be tagged as out of conformance, the question now becomes whether the agent was non-conformant for spending too much time or too little time addressing the reason on the communication. Therefore, the tagging module determines whether the actual handle time for the reason was greater than or less than the THT in Operation 1155. An actual handle time greater than the THT indicates the agent took more time than allocated to handle the communication for the particular reason. Therefore, in this instance, the tagging module tags the communication as being out of conformance with respect to adhering to the THT by having an actual handle time significantly greater than the THT in Operation 1160. However, an actual handle time less than the THT for the reason indicates the agent took too little of the time allocated to handle the communication for the particular reason. In this instance, the tagging module tags the communication as being out of conformance with respect to adhering to the THT by having an actual handle time significantly less than the THT in Operation 1165.

Accordingly, the contact center can identify communications of interest with respect to conforming to actual handle times by defining a threshold and tagging communications based on the threshold. Thus, the tagging module in various embodiments operates to tag "bad" performing communications that can then be further analyzed to identify and correct deficiencies within the contact center as well as tag "good" performing communications (communications with conforming actual handle times) that can then be further analyzed to identify superior performance that leads to high efficiencies within the contact center.

Of note, the threshold used in Operation 1145 to evaluate the difference between the actual handle time and the THT applied for the reason may be defined using different metrics and/or for different THTs according to various embodiments. For instance, in particular embodiments, the threshold may be defined at a set amount of time (such as a set amount of seconds) and/or may be defined differently depending on what THT was applied. For example, the threshold may be defined as twenty percent when the THT applied was three minutes and as twenty-five percent when the THT applied was ten minutes. In addition, different thresholds may be defined for evaluating communications in which the actual handle time is greater than the THT and non-conforming communications in which the actual handle time is less than the THT applied. In these particular instance, the process flow shown in FIG. 11 may be slightly modified so that Operation 1155 to determine whether the actual handle time is greater than the THT applied is performed prior to evaluating the difference between the two times so that the appropriate threshold can be applied.

Once the tagging module has completed evaluating the actual handle time and the THT applied for a particular reason, the tagging module considers whether another reason and corresponding disposition code are found for the communication record in Operation 1170. If so, then the tagging module returns to Operation 1125 and selects the next reason and corresponding disposition code and repeats the operations discussed above for the newly selected reason and corresponding disposition code.

However, if the tagging module instead determines another reason and corresponding disposition code do not exist for the communication record, then the tagging module determines whether another communication record exists that needs analyzed in Operation 1175. Is so, then the tagging module returns to Operation 1115 and selects the next record. If not, then the tagging module ends operation.

Real-Time Tracking Module

Figure 12:
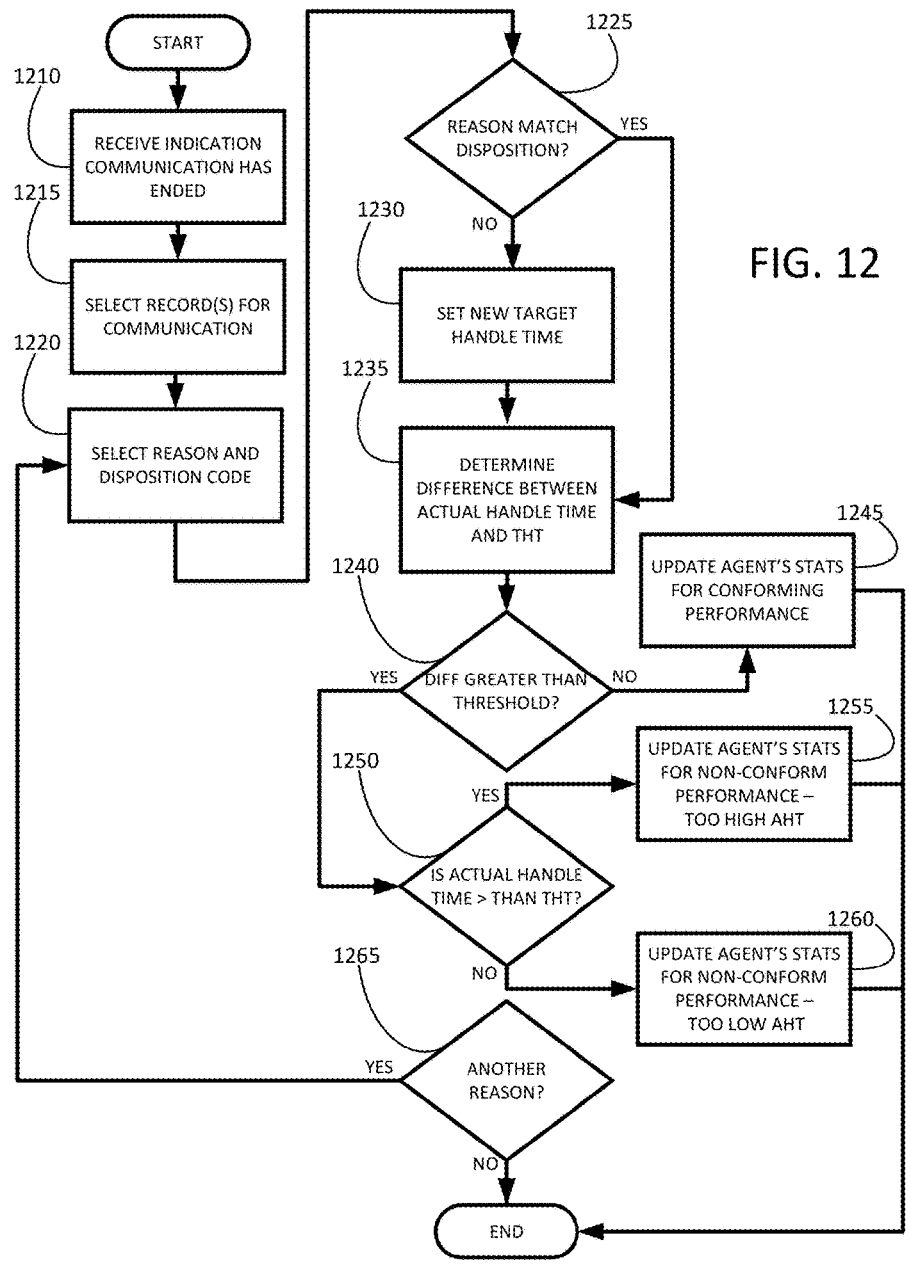
FIG. 12 illustrates a process flow for tracking real-time performance of compliance with target handle times in accordance with various embodiments of the present invention.

Turning now to FIG. 12, additional details are provided regarding a process flow for tracking real-time performance of compliance with THTs for agents and updating statistics according to various embodiments of the invention. In particular, FIG. 12 is a flow diagram showing a real-time tracking module for performing such functionality according to various embodiments of the invention. For example, the flow diagram shown in FIG. 12 may correspond to operations carried out by one or more processors in one or more components, such as, for example, the communications handler 155 described above, as it executes the real-time tracking module stored in the component's volatile and/or nonvolatile memory.

In particular embodiments, the real-time tracking module is executed in real-time as communications are completed by agents. For instance, an agent may be handling a communication and upon completing the communication, the agent indicates to the communications handler 155 that he or she is now available to handle a new communication. In response, the communications handler 155 invokes the real-time tracking module to track the agent's real-time performance of compliance with the THTs for the communication and updating statistics for the agent accordingly. As is discussed further below, these statistics can then be used to route further communications to the agent.

Therefore, turning to FIG. 12, the process flow begins with the real-time tracking module receiving an indication that a communication has ended in Operation 1210. Here, the indication may include identifying information for the communication as well as identifying information on the agent who handled the communication.

Accordingly, the real-time tracking module selects one or more records recorded on THTs that were applied during the communication in Operation 1215. Depending on the embodiment, each record may be specific to a reason for the communication that was identified during the communication. Therefore, a record may provide information related to the reason such as, for example, the THT that was applied for the reason, the actual handle time the agent spent handling the reason, and the disposition code assigned to the reason.

Therefore, the real-time tracking module selects the reason and disposition code for the first record in Operation 1220 and similar to the recording and tagging modules discussed above, determines whether the reason matches the disposition code in Operation 1225. Accordingly, in particular embodiments, the real-time tracking module may not be configured to perform the check on whether the reason matches the disposition code and instead, relies on another module such as the recording module to perform the check.

If the reason does not match the disposition code, then the real-time tracking module sets a new THT based on the disposition code in Operation 1230. In addition, in particular embodiments, the real-time tracking module replaces the reason with an appropriate reason based on the disposition code in the record.

At this point, the real-time tracking module determines the difference between the actual handle time and the THT in Operation 1235 and determines in Operation 1240 if the difference is greater than a threshold, similar to the tagging module previously discussed. If the difference is not greater than the threshold, then the real-time tracking module updates statistics for the agent in Operation 1245 to reflect the agent's conforming performance on the communication with respect to actual handle time for the particular reason.

However, if the difference is greater than the threshold, then the communication involves an instance in which the agent was non-conforming with respect to actual handle time for the particular reason. Again, the contact center may define thresholds using various metrics and/or for various situations. For example, the contact center may use a first threshold to identify communications considered not to be in conformance because agents took too much time to handle the particular reason during the communications and a second, different threshold to identify communications considered not to be in conformance because agents took too little time to handle the particular reason during the communications.

Thus, the real-time tracking module determines in Operation 1250 if the actual handle time is greater than the THT. As previously stated, an actual handle time greater than the THT indicates the agent took more time than was allotted to handle the reason for the communication and therefore, was non-conformant. While the opposite is true when the actual handle time is less than the THT. Here, the agent took too little of the time that was allotted to handle the reason for the communication therefore, was non-conformant. Therefore, in various embodiments, the contact center's defining of the applicable threshold(s) allows the contact center to identify instances in which the agent was non-conformant with respect to being significantly over and/or significantly under the THT. That is to say, the contact center's defining of the threshold(s) allows the contact center to identify instances in which the agent's performance is considered especially non-conformant with respect to the THT.

Therefore, if the actual handle time is greater than the THT, then the real-time tracking module updates the statistics for the agent to reflect a non-conformant performance based on too high of an actual handle time with respect to the THT in Operation 1255. For example, the contact center may track the percentage of communications an agent handles in which the agent's performance is considered non-conformant with respect to THT because the performance involves an actual handle time significantly greater than the THT. Depending on the embodiment, these percentages may be further broken down based on channels of communication and/or reasons for the communications.

Furthermore, if the actual handle time is less than the THT, then the real-time tracking module updates the statistics for the agent to reflect a non-conformant performance based on too low of an actual handle time with respect to the THT in Operation 1260. Again, depending on the embodiment, these percentages may be further broken down based on channels of communication and/or reasons for the communication.

Once the real-time tracking module has completed evaluating the reason and disposition code, the real-time tracking module determines whether another reason and corresponding disposition code were identified for the communication in Operation 1265. If so, then the real-time tracking module returns to Operation 1220 and selects the next reason and corresponding disposition code and performs the same operations as discussed above for the newly selected reason and disposition code. Once the real-time tracking module has processed all of the reasons for the communication, the process flow ends.

Accordingly, these statistics gathered for each agent and updated in real-time can be used in different processes, both real-time and non-real-time, within a contact center. For instance, particular contact centers may make use of these statistics as input for a real-time process for controlling the routing of communications to agents. While in other instances, particular contact centers may make use of these statistics as inputs to a workforce management process performed to schedule agents for different communication campaigns. One such process is demonstrated in FIG. 13.

Routing Module

Figure 13:
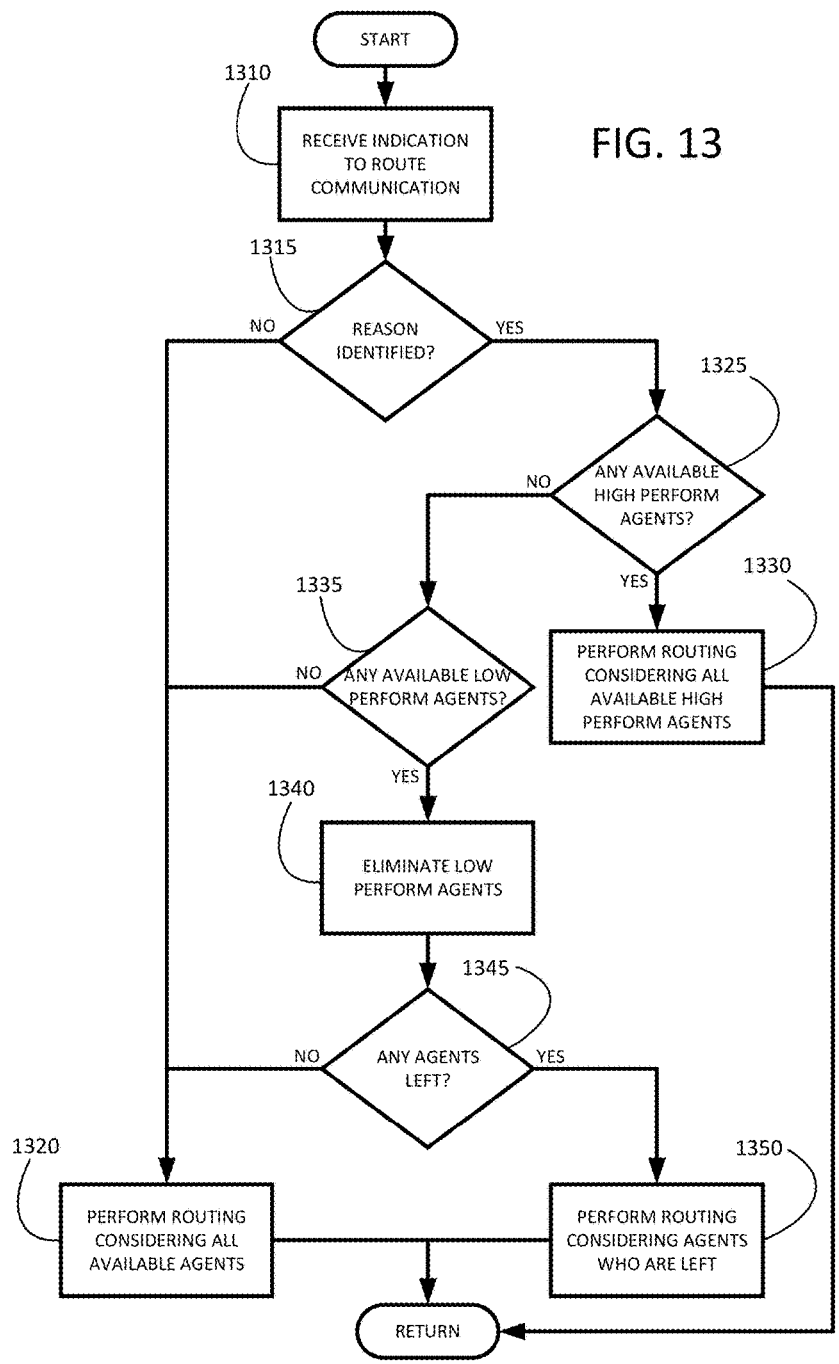
FIG. 13 illustrates a process flow for routing communications in accordance with various embodiments of the present invention.

Turning now to FIG. 13, additional details are provided regarding a process flow for routing communications to agents according to various embodiments of the invention. In particular, FIG. 13 is a flow diagram showing a routing module for performing such functionality according to various embodiments of the invention. For example, the flow diagram shown in FIG. 13 may correspond to operations carried out by one or more processors in one or more components, such as, for example, the communications handler 155 described above, as it executes the routing module stored in the component's volatile and/or nonvolatile memory.

Similar to the real-time tracking module, the routing module in particular embodiments is executed in real-time as the module is informed of communications to be routed to agents. Here, the communications handler 155 invokes the routing module to route a particular communication to an agent upon being informed of the communication. For instance, a text gateway server 140 may receive a text message and inform the communications handler 155 of the text message. In response, the communications handler 155 invokes the routing module and provides an indication to the routing module to route the text message to an agent.

Therefore, the process flow begins with the routing module receiving the indication in Operation 1310 to route the communication to an agent. Depending on the embodiment, the indication may provide different items of information such as, for example, a reason for the communication (if one has been identified), a campaign associated with the communication, and/or skills required by an agent to handle the communication.

Accordingly, the routing module determines whether a reason has been identified for the communication in Operation 1315. For example, the contact center may have performed some type of analysis on the text of the text message to detect one or more keywords in the text that can be used to identify a reason for the message. For instance, the text of the message may indicate the text was sent to request a price quote on one or more items. While in another example, the communication may be a voice call that is initially routed through an IVR and the IVR gathers information that identifies a reason for the communication.

Here, if a reason has not been identified for the communication, then the routing module simply performs routing of the communication by considering all of the available agents in Operation 1320. The particular routing of the communication may be performed based on any number of routing process flows as used by numerous contact centers depending on the embodiment. For example, a routing process flow may involving skills-based routing, routing to a group of agents assigned to a particular campaign, and/or routing to one or more specific queues. Those of ordinary skill in the art can envision multiple routing process flows that may be utilized in routing communications to agents in light of this disclosure.

However, returning to Operation 1315, if a reason has been identified for the communication, then the routing module determines whether any high performance agents are available to handle the communication in Operation 1325. Accordingly, in particular embodiments, the routing module may access statistics on the agents who are currently available to determine whether any of these agents are considered high performers with respect to THT for communications using a similar channel of communication and for a similar reason as the communication that needs to be routed. For example, an agent may be considered a high performer if ninety percent of the communications the agent fields using the same channel of communication and for the same reason as the communication that needs to be routed were in conformance with respect to actual handle time. Therefore, if high performance agents are available, then the routing module performs routing of the communication by considering these available high performance agents in Operation 1330.

However, if no high performance agents are available, then the routing module determines whether any available agents are considered low performers with respect to actual handle time for communications using a similar channel of communication and for a similar reason as the communication that needs to be routed in Operation 1335. For example, an agent may be considered a low performer if twenty-five percent of the communications the agent fields using the same channel of communication and for the same reason as the communication that needs to be routed were non-conformance (e.g., were tagged as non-conformant) with respect to actual handle time. If so, then these low performance agents are eliminated from consideration in Operation 1340.

At this point, the routing module determines whether any available agents remain after eliminating the low performance agents in Operation 1345. If so, then the routing module performs routing of the communication by considering the available agents remaining after eliminating the low performance agents in Operation 1350. However, if no agents remain, then the routing module simply performs routing of the communication by considering all of the available agents in Operation 1320.

As a result of this process flow, the routing module in various embodiments is able to route communications to optimal agents for handling the communications in many instances when reasons for the communications have been identified. For instance, an agent who is performing at a high level with respect to adhering to THT for voice calls involving parties wishing to place an order, but who is performing at a low level with respect to adhering to THT for voice calls involving parties seeking status information on particular orders, can expect to receive more phone calls from parties wishing to place orders than from parties seeking status information on particular orders. Accordingly, the routing module in various embodiments enables contact centers, and more specifically communications handlers 155, to operate in a more efficient manner in handling communications in a timely manner.

Agent GUI

Figure 14:
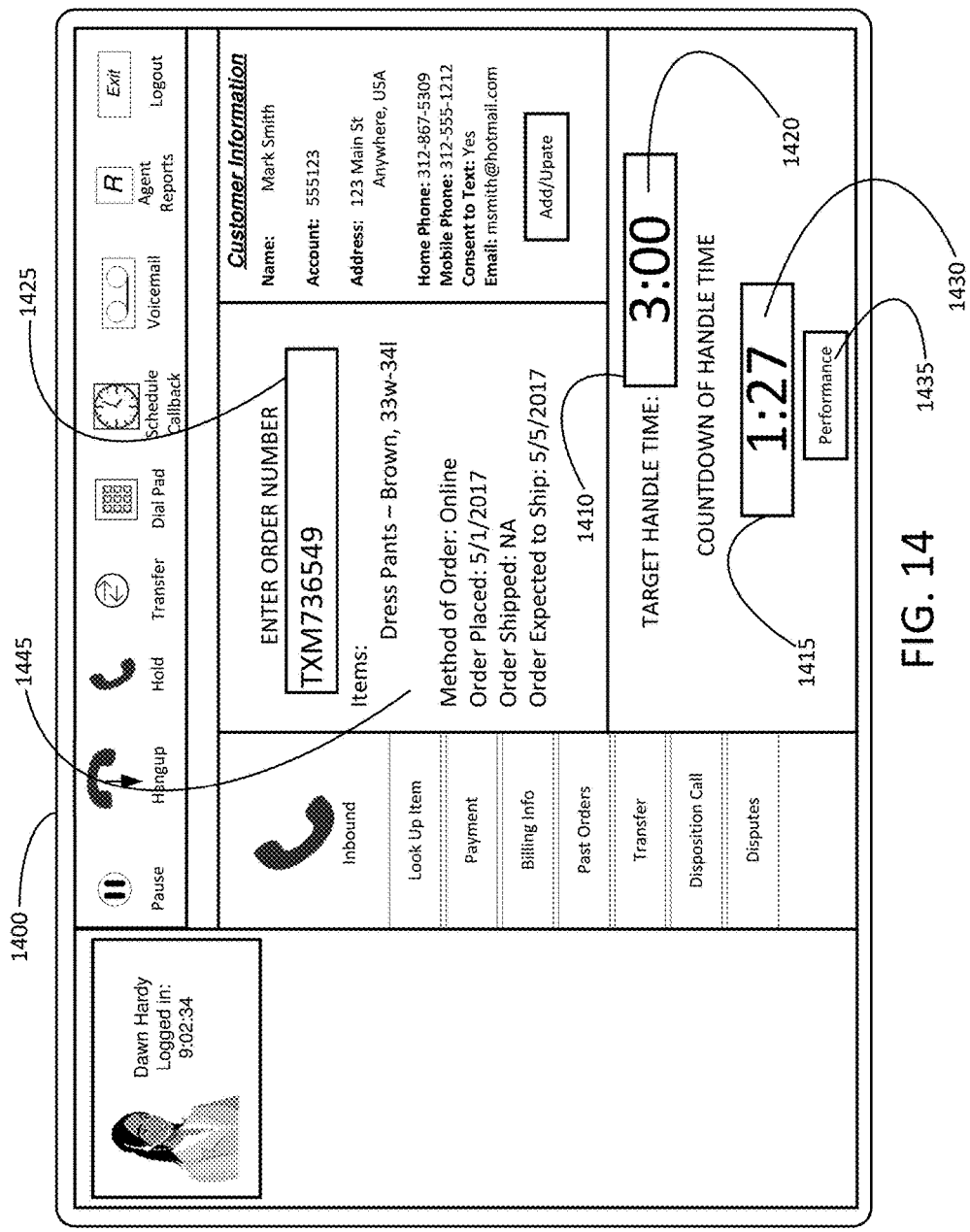
FIG. 14 illustrates a graphical user interface ("GUI") used in various embodiments by an agent in accordance with various embodiments of the present invention.

FIG. 14 illustrates a graphical user interface ("GUI") 1400 that may be used in various embodiments by an agent practicing different aspects of the invention. Here, the GUI 1400 presents information on a communication that has been routed to the agent, specifically an inbound telephone call. In addition, the GUI 1400 provides a field 1410 displaying a THT that is initially set at a default time of five minutes (not shown in FIG. 14) and a field 1415 displaying a decrementing THT counting down in seconds.

Here, the agent converses with the party on the call and the party comments that he has called to check on the status of an order the party placed on May 1, 2017. Therefore, the analytics component 150 detects the keyword "status" in the audio of the call and sends the communications handler 155 an event notification indicating the keyword. In turn, the communications handler 155 sends the notification to the agent's workstation and the reason for the call is identified as being made to check the status of an order.

As a result, the THT field 1410 is changed to no longer display the default THT of five minutes and now displays the applicable THT of three minutes 1420. Accordingly, the THT field 1410 now displays a THT that is more accurate with respect to the amount of time the agent should target spending on the phone call to assist the party. In addition, the decrementing THT field 1415 is also updated to display an accurate countdown of the handle time 1430.

At this point, the agent enters the order number in a field 1425 provided on the GUI 1400 and information on the order is populated in a section 1445 of the GUI 1400 so that the agent can convey the information to the party. At the same time, the agent can also monitor the countdown of the handle time 1430 to gauge the amount of time the agent has left to handle the call and still be in conformance with the THT of three minutes 1420.

Figure 15:
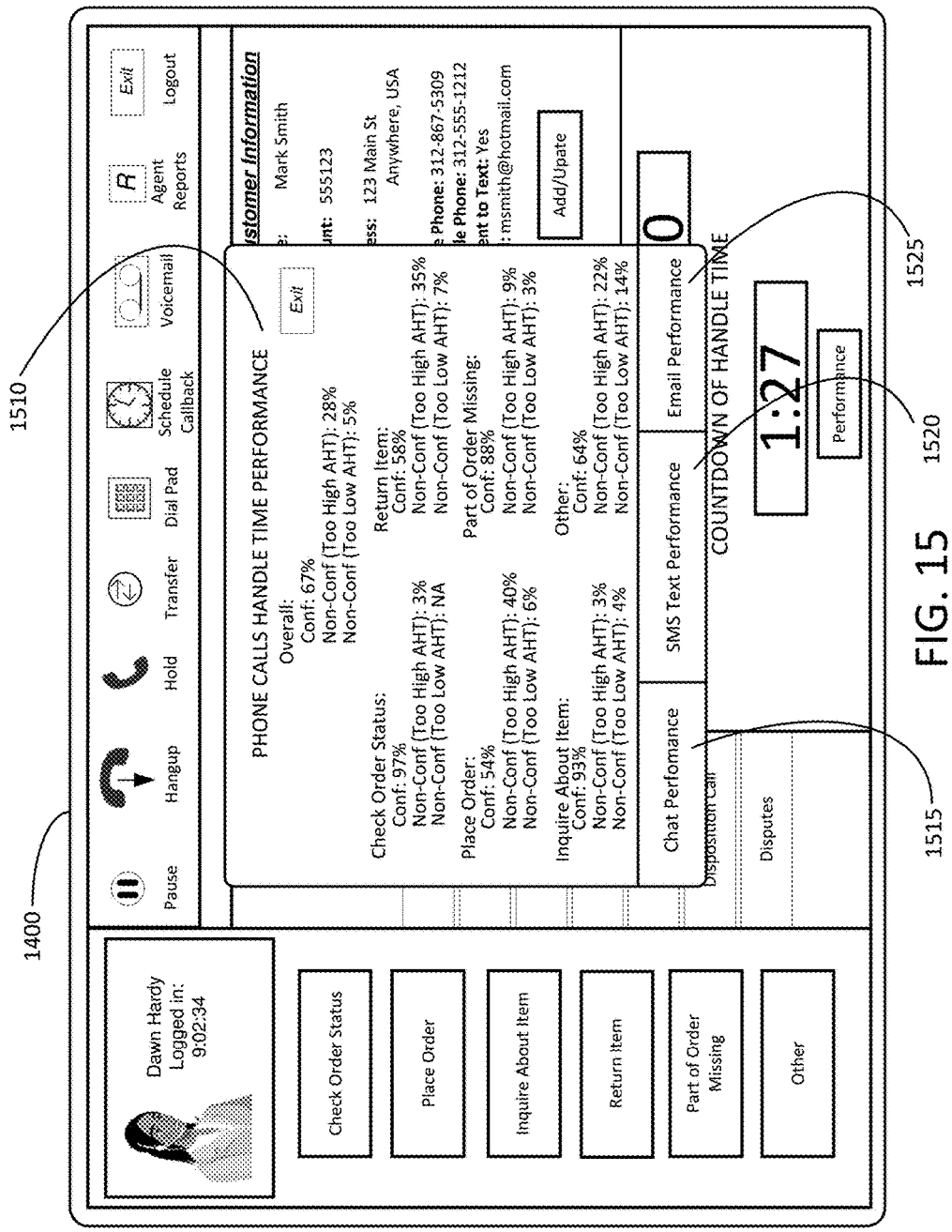
FIG. 15 also illustrates a graphical user interface ("GUI") used in various embodiments by an agent in accordance with various embodiments of the present invention.

Finally, the GUI 1400 shown in FIG. 14 provides a button 1435 that allows the agent to access information on his or her performance with respect to adhering to THTs. Here, in various embodiments, the agent may select the button 1435 to view such information. For instance, in particular embodiments, a pop-up GUI 1510 may be provided listing the agent's performance information as shown in FIG. 15. Here, the pop-up GUI 1510 provides the agent with statistics on the agent's performance with respect to adhering to THTs for various reasons on communications involving telephone calls. Specifically, the pop-up GUG 1510 provides the percentage of calls overall, and for each reason, in which the agent was considered in conformance with respect to adhering to the THT, the percentage of calls in which the agent was considered out of conformance with respect to adhering to the THT by having an actual handle time significantly greater than the THT, and the percentage of calls in which the agent was considered out of conformance with respect to adhering to the THT by having an actual handle time significantly less than the THT. In addition, the pop-up GUI 1510 provides the agent with selection buttons 1515, 1520, 1525 at the bottom of the GUI 1510 to allow the agent to view his or her performance with respect to other channels of communication.

Exemplary Processing Device Architecture

Figure 16:
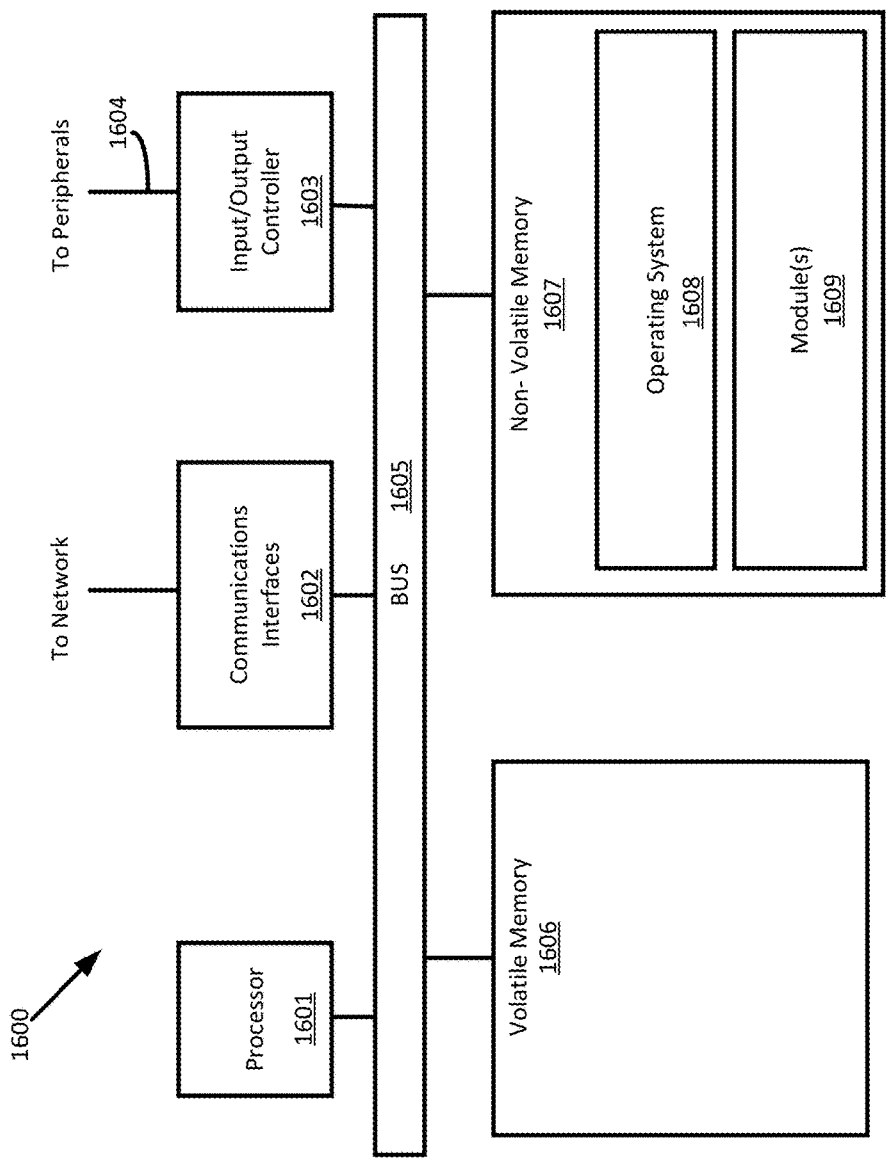
FIG. 16 is an exemplary schematic diagram of a processing component used in various embodiments of the contact center architecture to practice the technologies disclosed herein.

As discussed in conjunction with FIG. 1, the contact center architecture 100 may comprise various components. Accordingly, FIG. 16 is an exemplary schematic diagram of a processing component 1600 that may be used in various embodiments of the contact center architecture 100 to practice the technologies disclosed herein such as, for example, the communications handler 155, the email server 135, the text gateway server 140, the web server 145, and/or an agent's computing device 160a-160c. In general, the term "processing component" may be exemplified by, for example, but without limitation: a various types of computers, servers, blades, gateways, switches, and the like, as well as any combination of devices or entities adapted to perform the functions described herein.

As shown in FIG. 16, the processing component 1600 may include one or more processors 1601 that may communicate with other elements within the processing component 1600 via a bus 1605. The processor 1601 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 1600 may also include one or more communication interfaces 1602 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The processing component 1600 may further include an input/output controller 1603 that may communicate with one or more input devices or peripherals using an interface 1604, such as, but not limited to: a keyboard, a mouse, a touch screen/display input, microphone, pointing device, etc. The input/output controller 1603 may also communicate with output devices or peripherals, such as displays, printers, speakers, headsets, banner displays, etc.

The processor 1601 may be configured to execute instructions stored in volatile memory 1606, non-volatile memory 1607, or other forms of computer-readable storage media accessible to the processor 1601. The volatile memory 1606 may comprise various types of memory technologies, including, but not limited to: random access memory ("RAM"), dynamic random access memory ("DRAM"), static random access memory ("SRAM"), and other forms well known to those skilled in the art. The non-volatile memory 1607 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1607 may store program code and data, which also may be loaded into the volatile memory 1606 at execution time. Specifically, the non-volatile memory 1607 may store one or more program modules 1609, such as the modules described above, containing instructions for performing the processes and/or functions associated with the technologies disclosed herein, and/or operating system code 1608. In addition, these program modules 1609 may also access, generate, or store data 1610, in the non-volatile memory 1607, as well as in the volatile memory 1606. The volatile memory 1606 and/or non-volatile memory 1607 may be used to store other information including, but not limited to: records, applications, programs, scripts, source code, object code, byte code, compiled code, interpreted code, machine code, executable instructions, or the like. These may be executed or processed by, for example, the processor 1601 and/or may form a part of, or may interact with, the program modules 1609.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Additional Improvements Realized by Evaluating Handle Times More Accurately

Finally, a number of additional improvements can be realized in various embodiments of the invention as a result of more accurately evaluating handle times for agents in a contact center and analyzing communications that have been tagged appropriately based on these handle times. An example is now provided to illustrate such improvements. Here, a particular agent handling customer service calls at a contact center has fielded five hundred calls during a work week that included one hundred calls in which a party called to check on the status of an order, two hundred and fifty calls in which a party called to place an order, and one hundred and fifty calls in which a party called to return an item for a refund.

Under a conventional use of a THT, the contact center sets a THT of five minutes for all customer service calls and accordingly, the agent fields what the contact center considers to be a high number of non-conformant telephone calls (one hundred and seventy-five) that were (significantly) over the THT. However, half the agent's calls (two hundred and fifty) involved parties calling to place an order. A call involving a party calling to place an order normally takes longer than a call involving a party calling to check the status of an order or a call involving a party calling to return an item. Therefore, in this instance, the contact center may come to the misleading conclusion that this particular agent is under performing because he or she has had such a high number of non-conforming calls with respect to the THT set by the center.

Even if the contact center were to consider the reasons for the calls, the center may still reach a misleading conclusion with respect to this particular agent under the conventional use of a single THT set at five minutes for all calls. In the example, the breakdown of the one hundred and seventy-five non-conformant calls for the agent may have included zero non-conformant calls in which a party called to check the status of an order, one hundred and sixty non-conformant calls in which a party called to place an order, and fifteen non-conformant calls in which a party called to return an item. Here, the contact center may still reach the misleading conclusion that this particular agent is under performing and more specifically, this particular agent is under performing with respect to taking too long to handle calls involving parties calling to place orders. Accordingly, the contact center may attempt to address this conclusion by providing the agent with more training in handling calls involving taking orders and/or may divert such calls away from this agent and only allow the agent to handle other types of calls.

However, if the contact center were instead to adjust the THT for each call based on the reason for the call, as is done in various embodiments of the invention, then the conclusions reached by the contact center are likely to be more accurate. For instance, returning to the example, the contact center may set the THT for calls involving a party calling to check the status of an order to three minutes, the THT for calls involving a party calling to place an order to ten minutes, and the THT for calls involving a party calling to return an item to five minutes. Now, the THT for each call more accurately identifies the amount of time the agent should spend handling a particular call.

As a result, the agent now only has a total of thirty non-conformant calls that were over the THT, with a breakdown that includes five non-conformant calls in which a party called to check the status of an order, ten non-conformant calls in which the party called to place an order, and fifteen non-conformant calls in which the party called to return an item. Here, the contact center is more likely to come to a reliable conclusion such as, for example, this particular agent is performing at an acceptable level overall. Further, as a consequence, the center is less likely to waste effort and resources addressing deficiencies of agents that have been misidentified and is more likely to make use of such effort and resources to address legitimate deficiencies that when corrected, truly improve the efficiency of the contact center.

For instance, the contact center may conclude that although the agent is performing at an overall acceptable level with respect to handle times, the agent's performance is non-conformant with respect to calls involving a party calling to return an item. Here, the agent handled one hundred and fifty calls involving parties calling to return items and fifteen of those calls, or ten percent of those calls, were over the THT of five minutes. In this instance, since the contact center has more accurately identified a deficiency of the agent, the contact center may help to actually improve the agent's efficiency by providing further training on fielding calls by parties returning items.

In addition to the above advantages, evaluating handle times for agents more accurately and analyzing communications that have been tagged appropriately based on these handle times allows a contact center in various embodiments to better identify deficiencies within the contact center architecture with respect to the various inputs used by the contact center other than just the agents themselves (e.g., deficiencies with respect to the different technologies, systems, and communication channels used by the contact center). For instance, returning to the example, the contact center may deduct from looking at non-conformant results for a number of agents that a large portion of agents are non-conformant with respect to fielding calls involving parties who have called to return an item. Accordingly, such a deduction may indicate this problem is not necessarily a product of the agents' performance themselves but instead is a product of some other input within the contact center.

For example, every inbound call received by the contact center may be initially routed to an IVR to gather information on the call and to route the call accordingly. Therefore, an indication that a large number of agents have a non-conformant AHT with respect to fielding calls involving parties calling to return an item may indicate that the IVR is not effectively handling these calls. For instance, the IVR may not be gathering the right information from the parties on these calls before routing them to agents and as a result, agents are having to spend time on the calls gathering such information from the parties before being able to process the returns. While in another instance, the IVR may be routing these calls to the wrong agents instead of agents who are better qualified to handle these types of calls. While in another instance, the contact center may not be utilizing the IVR with an optimal configuration. For example, the contact center may be able to configure the IVR so that the IVR may be able to assist a large majority of the parties with returning items without having to involve an agent. That is to say, the contact center may be able to configure the IVR to automate the process for returning an item for a majority of calls so that agents are not required to field these calls.

In another example in which the communications are chat sessions initiated from a website the parties visit instead of telephone calls, a large portion of the agents being non-conformant with respect to fielding these chats may indicate the website is ineffective in facilitating the returning of items. Specifically, the website may be confusing or not user friendly in helping parties return items and thus causing delays during the chat sessions with agents. Thus, evaluating handle times for agents more accurately can allow a contact center in various embodiments to identify deficiencies with respect to routing communications within the contact center architecture.

The same can be said for agent workflows. Evaluating handle times for agents more accurately can help to identify agent workflows and processes that are not tailored to optimize agent productivity. For instance, workflows followed by agents in handling certain types of communications (e.g., phone calls from parties calling to return an item) may include items that inflate handling time without really adding to a good customer experience. For example, a workflow may require an agent to ask a party for an account number when the party had already provided his or her account number to an IVR. Here, the account number should have been carried forward from the IVR to the agent's workstation so that the workflow is more streamlined and requires less of the agent's time requesting information that has already been provided. Similarly, a workflow may contain items that can be automated and/or eliminated from the workflow thus, decreasing the handle time needed by agents for communications involving the workflow.

In addition, evaluating handle times for agents more accurately can help contact centers answer questions of whether the right information and tools are being provided to agents to allow them to handle communications quickly. For instance, such evaluations can help contact centers answer questions about workflows such as are agents being expected to juggle too many tasks/systems/tools at one time, is the information being provided to agents up to date and accurate, are agents asking the right questions and providing the right answers to parties, and is a workflow creating instances of silence between the agent and party that can be eliminated?

Furthermore, evaluating handle times for agents more accurately can help contact centers identify deficiencies in system capabilities. For instance, such an evaluation can help to identify system response times and/or speeds that are too slow such as, for example, a system query that is returning results too slowly. In addition, such an evaluation can help to identify incompatibilities between different systems. For example, instances where an agent is required to cut and paste information from one system to another because the two systems cannot talk to one another. Furthermore, such an evaluation can help to identify improper and/or poor communication connectivity. For example, instances where voice call connections are providing subpar voice clarity. Those of ordinary skill in the art can envision other instances where evaluating handle times for agents more accurately can help contact centers identify deficiencies within the centers' architectures in light of this disclosure.

Finally, evaluating handle times for agents more accurately can help contact centers identify deficiencies in other aspects of operations. For instance, such evaluations can help identify deficiencies that lead to reasons why parties are contacting a contact center. For example, marketing materials may be too complicated and/or confusing and lead to parties contacting the contact center for clarification. In another example, a contact center may not be properly promoting websites and text alerts as alternatives to having to contact the contact center for particular information and/or purposes. Thus, as one can see, evaluating handle times for agents more accurately can lead to many improvements within a contact center environment because doing so in many instances can lead to more reliable conclusions and as a result, allow the contact center to better identify deficiencies within the contact center environment.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for establishing a target handle time for a communication routed to an agent in a contact center comprising:
    monitoring the communication by an analytics component to identify an occurrence of a keyword in the communication;
    identifying a reason for the communication based on the keyword in response to identifying the occurrence of the keyword in the communication;
    in response to identifying the reason for the communication:
        setting the target handle time for the communication based on the reason identified for the communication; and
        displaying a visual representation of the target handle time on a graphical user interface (GUI) displayed on a workstation being used by the agent, the visual representation comprising a component decrementing with a passage of time; and
    upon a disposition code being entered by the agent on the workstation for the communication:
        confirming by a computer processor the disposition code entered by the agent matches the reason identified for the communication; and
        in response to the disposition code matching the reason identified for the communication:
            recording the target handle time for the communication in memory; and
        in response to the disposition code not matching the reason identified for the communication:
            setting a revised target handle time for the communication based on the disposition code; and
            recording the revised target handle time for the communication in the memory.

2. The method of claim 1, wherein the computer processor resides in the workstation being used by the agent.

3. The method of claim 1 further comprising initially displaying the component of the visual representation of the target handle time on the GUI as a default target handle time decrementing with the passage of time, wherein displaying the visual representation of the target handle time on the GUI in response to identifying the reason for the communication comprises revising the component of the visual representation to display the target handle time minus a decrement of the default target handle time decrementing with the passage of time.

4. The method of claim 1 further comprising:
    determining an actual handle time for the communication, the actual handle time representing the actual amount of time elapsed while the agent interacted with a party on the communication to address the reason identified for the communication;

determining a difference between the actual handle time and at least one of the target handle time and the revised target handle time; and tagging the communication by the computer processor in the memory in response to the difference being greater than a threshold.

5. The method of claim 4, wherein the communication is tagged as non-conformant with a high actual handle time if the actual handle time is greater than at least one of the target handle time and the revised target handle time and the communication is tagged as non-conformant with a low actual handle time if the actual handle time is less than at least one of the target handle time and the revised target handle time.

6. The method of claim 1 further comprising:

determining an actual handle time for the communication, the actual handle time representing the actual amount of time elapsed while the agent interacted with a party on the communication to address the reason identified for the communication;

determining a difference between the actual handle time and at least one of the target handle time and the revised target handle time; and upon the different being greater than a threshold:

updating a first performance statistic by the computer processor in the memory to reflect the actual handle time is too high for the communication if the actual handle time is greater than at least one of the target handle time and the revised target handle time; and updating a second performance statistic by the computer processor in the memory to reflect the actual handle time is too low for the communication if the actual handle time is less than at least one of the target handle time and the revised target handle time.

7. The method of claim 6 further comprising routing a second communication to the agent by a communications handler based on at least one of the first performance statistic and the second performance statistic.

8. The method of claim 1, wherein the component of the visual representation of the target handle time is initially displayed on the GUI using a first color, is displayed on the GUI using a second color in response to the component of the visual representation decrementing below a first threshold value, and is displayed on the GUI using a third color in response to the component of the visual representation decrementing below a second threshold value.

9. A non-transitory, computer-readable medium comprising computer-executable instructions for establishing a target handle time for a communication routed to an agent in a contact center, that when executed, cause at least one computer processor to:

in response to identifying a reason for the communication based on a keyword detected in the communication by an analytics component:

set the target handle time for the communication based on the reason identified for the communication; and display a visual representation of the target handle time on a graphical user interface (GUI) displayed on a workstation being used by the agent, the visual representation comprising a component decrementing with a passage of time; and upon a disposition code being entered by the agent on the workstation for the communication:

confirm the disposition code entered by the agent matches the reason identified for the communication; and in response to the disposition code matching the reason identified for the communication:

record the target handle time for the communication in memory; and in response to the disposition code not matching the reason identified for the communication;

set a revised target handle time for the communication based on the disposition code; and record the revised target handle time for the communication in the memory.

10. The non-transitory, computer-readable medium of claim 9, wherein the at least one computer processor resides in the workstation being used by the agent.

11. The non-transitory, computer-readable medium of claim 9, wherein the computer-executable instructions cause the at least one computer processor to initially display the component of the visual representation of the target handle time on the GUI as a default target handle time decrementing with the passage of time, and cause the at least one computer processor to display the visual representation of the target handle time on the GUI in response to identifying the reason for the communication by revising the component of the visual representation to display the target handle time minus a decrement of the default target handle time decrementing with the passage of time.

12. The non-transitory, computer-readable medium of claim 9, wherein the computer-executable instructions cause the at least one computer processor to:

determine an actual handle time for the communication, the actual handle time representing the actual amount of time elapsed while the agent interacted with a party on the communication to address the reason identified for the communication;

determine a difference between the actual handle time and at least one of the target handle time and the revised target handle time; and tag the communication in the memory in response to the difference being greater than a threshold.

13. The non-transitory, computer-readable medium of claim 12, wherein the communication is tagged as non-conformant with a high actual handle time if the actual handle time is greater than at least one of the target handle time and the revised target handle time and the communication is tagged as non-conformant with a low actual handle time if the actual handle time is less than at least one of the target handle time and the revised target handle time.

14. The non-transitory, computer-readable medium of claim 9, wherein the computer-executable instructions cause the at least one computer processor to:

determine an actual handle time for the communication, the actual handle time representing the actual amount of time elapsed while the agent interacted with a party on the communication to address the reason identified for the communication;

determine a difference between the actual handle time and at least one of the target handle time and the revised target handle time; and upon the different being greater than a threshold:

update a first performance statistic in the memory to reflect the actual handle time is too high if the actual handle time is greater than at least one of the target handle time and the revised target handle time; and update a second performance statistic in the memory to reflect the actual handle time is too low if the actual handle time is less than at least one of the target handle time and the revised target handle time.

15. The non-transitory, computer-readable medium of claim 14, wherein a second communication is routed to the agent based on at least one of the first performance statistic and the second performance statistic.

16. The non-transitory, computer-readable medium of claim 9, wherein the component of the visual representation of the target handle time is initially displayed on the GUI using a first color, is displayed on the GUI using a second color in response to the component of the visual representation decrementing below a first threshold value, and is displayed on the GUI using a third color in response to the component of the visual representation decrementing below a second threshold value.

17. A system for establishing a target handle time for a communication routed to an agent in a contact center, the system comprising:
An analytics component configured to monitor the communication to detect a keyword in the communication; and
at least one computer processor configured to:
identify a reason for the communication based on the keyword; and
in response to identifying the reason for the communication:
set the target handle time for the communication based on the reason identified for the communication; and
display a visual representation of the target handle time on a graphical user interface (GUI) displayed on a workstation being used by the agent, the visual representation comprising a component decrementing with a passage of time; and
upon a disposition code being entered by the agent on the workstation for the communication:
confirm the disposition code entered by the agent on the workstation for the communication matches the reason identified for the communication;
in response to the disposition code matching the reason identified for the communication:
record the target handle time for the communication in memory; and
in response to the disposition code not matching the reason identified for the communication;
set a revised target handle time for the communication based on the disposition code; and
record the revised target handle time for the communication in the memory.

18. The system of claim 17, wherein the at least one computer processor resides in the workstation being used by the agent.

19. The system of claim 17, wherein the at least one computer processor is configured to initially display the component of the visual representation of the target handle time on the GUI as a default target handle time decrementing with the passage of time, and to display the visual representation of the target handle time on the GUI in response to identifying the reason for the communication by revising the component of the visual representation to display the target handle time minus a decrement of the default target handle time decrementing with the passage of time.

20. The system of claim 17, wherein the at least one computer processor is configured to:
determine an actual handle time for the communication, the actual handle time representing the actual amount of time elapsed while the agent interacted with a party on the communication to address the reason identified for the communication;
determine a difference between the actual handle time and at least one of the target handle time and the revised target handle time; and
tag the communication in the memory in response to the difference being greater than a threshold.

21. The system of claim 20, wherein the communication is tagged as non-conformant with a high actual handle time if the actual handle time is greater than at least one of the target handle time and the revised target handle time and the communication is tagged as non-conformant with a low actual handle time if the actual handle time is less than at least one of the target handle time and the revised target handle time.

22. The system of claim 17, wherein the at least one computer processor is configured to:
determine an actual handle time for the communication, the actual handle time representing the actual amount of time elapsed while the agent interacted with a party on the communication to address the reason identified for the communication;
determine a difference between the actual handle time and at least one of the target handle time and the revised target handle time; and
upon the different being greater than a threshold:
update a first performance statistic in the memory to reflect the actual handle time is too high if the actual handle time is greater than at least one of the target handle time and the revised target handle time; and
update a second performance statistic in the memory to reflect the actual handle time is too low if the actual handle time is less than at least one of the target handle time and the revised target handle time.

23. The system of claim 22 further comprising a communications handler configured to route a second communication to the agent based on at least one of the first performance statistic and the second performance statistic.

24. The system of claim 17, wherein the component of the visual representation of the target handle time is initially displayed on the GUI using a first color, is displayed on the GUI using a second color in response to the component of the visual representation decrementing below a first threshold value, and is displayed on the GUI using a third color in response to the component of the visual representation decrementing below a second threshold value.

* * * * *